(12) United States Patent
Gopinathan et al.

(10) Patent No.: US 6,330,546 B1
(45) Date of Patent: Dec. 11, 2001

(54) RISK DETERMINATION AND MANAGEMENT USING PREDICTIVE MODELING AND TRANSACTION PROFILES FOR INDIVIDUAL TRANSACTING ENTITIES

(75) Inventors: Krishna M. Gopinathan; Allen Jost, both of San Diego; Louis S. Biafore, Del Mar; William M. Ferguson, San Diego; Michael A. Lazarus, Del Mar; Anu K. Pathria, Oakland, all of CA (US)

(73) Assignee: HNC Software, Inc., San Diego, CA (US)

( * ) Notice: Subject to any disclaimer, the term of this patent is extended or adjusted under 35 U.S.C. 154(b) by 0 days.

(21) Appl. No.: 09/167,102

(22) Filed: Oct. 5, 1998

Related U.S. Application Data

(63) Continuation of application No. 07/941,971, filed on Sep. 8, 1992, now Pat. No. 5,819,226.

(51) Int. Cl.[7] .................................................... G06F 17/60
(52) U.S. Cl. .................... 705/35; 705/38; 705/1
(58) Field of Search ................... 705/1, 38, 42, 705/35, 44, 14

(56) References Cited

U.S. PATENT DOCUMENTS

| | | | |
|---|---|---|---|
| 5,025,372 | * 6/1991 | Burton et al. | 705/14 |
| 5,146,067 | 9/1992 | Sloan et al. | 235/381 |
| 5,231,570 | * 7/1993 | Lee | 705/38 |
| 5,262,941 | * 11/1993 | Saladin et al. | 705/38 |
| 5,335,278 | * 8/1994 | Matchett et al. | 380/23 |
| 5,344,495 | * 9/1994 | Johnson et al. | 455/410 |
| 5,398,300 | 3/1995 | Levey | 395/22 |
| 5,732,397 | * 3/1998 | DeTore et al. | 705/1 |
| 5,819,226 | * 10/1998 | Gopinathan et al. | 705/1 |

FOREIGN PATENT DOCUMENTS

| | | | |
|---|---|---|---|
| 1252566 | 4/1989 | (CA) . | |
| 2032126 | 8/1993 | (CA) . | |
| 2052033 | 1/1999 | (CA) . | |
| 0 418 144 A1 | 3/1991 | (EP) | G06F/7/08 |
| 0 421 808 A3 | 4/1991 | (EP) | G07F/7/10 |
| A 62-75768 | 4/1987 | (JP) | G06F/15/30 |
| A 63-184870 | 7/1988 | (JP) | G06F/15/30 |
| A 4-113220 | 4/1992 | (JP) | G01D/3/00 |
| A 4-220758 | 8/1992 | (JP) | G06F/15/18 |
| WO 89/06398 | 7/1989 | (WO) | G06F/15/30 |

OTHER PUBLICATIONS

Kim S. Nash, "Bank Enlists Neural Net to Fight Fraud", Computerworld, vol. 25, No. 51, pp. 53, Jan. 1992.*
Anonymous, "Mellon Buys Software to Fight Card Fraud", American Banker, vol. 156, No. 238, pp. 3, Dec. 1991.*
Karen Gullo, "Neural Nets Versus Card Fraud: Chase's Software Learns to Detect Potential Crime", American Banker, vol. 155, No. 23, pp. 3, Feb. 1990.*
Marose, Robert A., "A Financial Neural–Network Application", AI Expert, vol. 5, No. 5, May, 1990, pp. 50–53, May 1990.*
Seidenberg, John P. et al., "Chase Employing Neural Network to Combat Card Fraud", CARD NEWS, vol. 4, No. 22, Nov. 13, 1989, Nov. 1989.*

(List continued on next page.)

*Primary Examiner*—Tariq R. Hafiz
*Assistant Examiner*—Alexander Kalinowski
(74) *Attorney, Agent, or Firm*—Fenwick & West LLP

(57) ABSTRACT

An automated system and method detects fraudulent transactions using a predictive model such as a neural network to evaluate individual customer accounts and identify potentially fraudulent transactions based on learned relationships among known variables. The system may also output reason codes indicating relative contributions of various variables to a particular result. The system periodically monitors its performance and redevelops the model when performance drops below a predetermined level.

79 Claims, 21 Drawing Sheets

OTHER PUBLICATIONS

"New Automated 'Experts' Ready for Lenders", Aba Banking Journal, vol. 84, No. 1, Jan. 1992, Jan. 1992.*

"Banks Wise Up to the Expertise of Artificial Intelligence Systems", Bank Technology News, Sep. 1992, Sep. 1992.*

"Neural Nets Versus Card Fraud: Chase's Software Learns to Detect Potential Crime", American Banker, vol. 155, No. 23, Feb. 2, 1990, Feb. 2, 1990.*

Joachim Utans and John Moody, "Selecting Neural Network Architectures via the Prediction Risk: Application to Corporate Bond Rating Prediction", IEEE, 1991.*

Boris, Larry, "People vs. Machine: A Case for Automated Tracking Systems," Credit World, vol. 80, No. 5, May/Jun. Aug. 1992.*

"Closing Ranks Against Fraud", Bank Systems & Technology, vol. 29, No. 2, Feb, 1992.*

Punch, Linda, "A Banner Year for the Crooks", Credit Card Management, vol. 4, No. 12, Mar., 1992.*

Electric Academy Electric Power Technology Institute Data PE–89–33, "Analysis of Learning Process of Neural Network on Security Assessment", pp. 161–170.

International Searc Report, International Application No. PCT/US93/08400, mailed Jan. 12. 1994.

Rumelhart, D.E., et al., "Learning Representations by Back–Propagating Errors", *Nature v 323*, pp. 533–536 (1986).

Hecht–Nielsen, R., "Theory of the Backpropagation Neural Network", *Neural Networks for Perception*, pp. 65–93 (1992).

Weigend, A.S., et al., "Generalization by Weight–Elimination with Application to Forecasting", *Advances in Neural Information Processing Systems 3*, pp. 875–882.

* cited by examiner

```
┌─────────────────────────────────────────────────────┐
│ ─            Account  Score                         │
│ Account │4400613000006130│  Name │Sandra   Simpson│ │
│                                              ╲─402  │
│                       Score │966│                   │
│         Reasons                  ╲─403              │
│  1 │Suspicious  approve/decline  pattern │  ⎫       │
│                                              ⎬      │
│  2 │Suspicious  recent  transaction  rate │  ⎬      │
│                                              ⎬      │
│  3 │Suspicious  previous  day  transaction  activity│⎭
│                                          404 ─╯     │
│                                                     │
│ Current  and  Previous  7  days  │Auth  Records│    │
│ Tran Amt    Date    Time   Avcred CredLim Sic MerchZip
│ ┌────────────────────────────────────────────────┐  │
│ │ME  22.10  920320  111856  10.00 1000.00 5399 0.00│
│ │ME  29.95  920320  112737  32.00 1000.00 5399 0.00│
│ │ME  25.30  920321  235944  61.00 1000.00 5812 0.00│
│ │ME  23.04  920322   3624   61.00 1000.00 5331 0.00│
│ │MD  54.00  920322  142607  86.00 1000.00 5331 0.00│
│ │MD  54.00  920322  142756  86.00 1000.00 5311 0.00│
│ └────────────────────────────────────────────────┘  │
│        ╲─405           Last  6  months              │
│ ┌────────────────────────────────────────────────┐  │
│ │MD  10.35  920217  224749  127.00 1000.00 5942 0.00│
│ │MA  50.00  920222  230825  685.00 1000.00 5541 0.00│
│ │MA  69.27  920223   4446   635.00 1000.00 5812 0.00│
│ │MA  10.35  920223   5800   566.00 1000.00 5942 0.00│
│ │MA  25.37  920224  202441  556.00 1000.00 5499 0.00│
│ │MA 254.70  920229   4803   507.00 1000.00 5399 0.00│
│ └────────────────────────────────────────────────┘  │
│     ╲─406         │ OK │        │ Help │            │
└─────────────────────────────────────────────────────┘
                                              ╲─401
```

FIGURE 4

Record Length=784

0
Name= ACCOUNT
Type=EXCLUDE
Slab=NONE
Size=0
Start=0 Length=16
RecCnt=0
Min=1.7976931e+308  Max=-1.7976931e+308
MissingValue=0.
Sum=0.
Mean=0.
StdDev=0.
Derivative=0
TimeSlice=0      ← 2101
NbrOfSymbols=0
Symbolic=NUMERIC
ScaleMode=AUTO  ScaleFn=LIN
DivFlag=0
Divisor=0.  Range=0.

0
Name=PAUDYMDY
Type=CONTINUOUS
Slab=INPUT
Size=1
Start=16 Length=12
RecCnt=23312
Min=3.22581e-002  Max=1.
MissingValue=0.18761507
Sum=4373.6825
Mean=0.18761507   ← 2102
StdDev=0.13174467
Derivative=0
TimeSlice=0
NbrOfSymbols=0
Symbolic=NUMERIC
ScaleMode=AUTO  ScaleFn=LIN
DivFlag=0
Divisor=0.  Range=0.9677419

*FIGURE 21*

RISK DETERMINATION AND MANAGEMENT USING PREDICTIVE MODELING AND TRANSACTION PROFILES FOR INDIVIDUAL TRANSACTING ENTITIES

CROSS-REFERENCE TO RELATED APPLICATION

This application is a continuation of U.S. application Ser. No. 07/941,971, filed on Sep. 8, 1992, entitled "Fraud Detection Using Predictive Modeling" and issued as U.S. Pat. No. 5,819,226, which is incorporated by reference herein in its entirety. This application is also related to U.S. Pat. No. 5,398,300 for "Neural Network Having Expert System Functionality", which is incorporated by reference herein in its entirety.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

1. Field of the Invention

This invention relates generally to the detection of fraudulent use of customer accounts and account numbers, including for example credit card transactions. In particular, the invention relates to an automated fraud detection system and method that uses predictive modeling to perform pattern recognition and classification in order to isolate transactions having high probabilities of fraud.

2. Description of the Related Art

In the following discussion, the term "credit card" will be used for illustrative purposes; however, the techniques and principles discussed herein apply to other types of customer accounts, such as charge cards, bank automated teller machine cards and telephone calling cards.

Credit card issuers conventionally attempt to limit fraud losses by immediately closing a customer's account upon receiving a report that the card has been lost or stolen. Typically, the customer's credit information is then transferred to a new account and a new card is issued. This procedure is only effective in limiting fraudulent use of lost or stolen cards after the loss or theft has been reported to the issuer.

In many cases, however, fraudulent use occurs without the knowledge of the cardholder, and therefore no report is made to the issuer. This may occur if the customer is unaware that the card has been lost or stolen, or if other techniques are employed to perpetrate the fraud, such as: use of counterfeit cards; merchant fraud; application fraud; or interception of credit cards in the mail. In all these situations, the fraudulent use may not be detected until (and unless) the cardholder notices an unfamiliar transaction on his or her next monthly statement and contests the corresponding charge. The concomitant delay in detection of fraud may result in significant losses. User fraud, in which the user claims that a valid transaction is invalid, is also possible.

Issuers of credit cards have sought to limit fraud losses by attempting to detect fraudulent use before the cardholder has reported a lost or stolen card. One conventional technique is known as parameter analysis. A parameter analysis fraud detection scheme makes a decision using a small number of database fields combined in a simple Boolean condition. An example of such a condition is:

if (number of transactions in 24 hours >X) and (more than Y dollars authorized) then flag this account as high risk Parameter analysis will provide the values of X and Y that satisfy either the required detection rate or the required false positive rate. In a hypothetical example, parameter values of X=400 and Y=1000 might capture 20% of the frauds with a false positive rate of 200:1, while X=6 and Y=2000 might capture 8% of the frauds with a false positive rate of 20:1.

The rules that parameter analysis provides are easily implemented in a database management system, as they are restricted to Boolean (e.g., and, or) combinations of conditions on single variables.

Parameter analysis derives rules by examining the single variables most able to distinguish fraudulent from non-fraudulent behavior. Since only single-variable threshold comparisons are used, complex interactions among variables are not captured. This is a limitation that could cause the system to discriminate poorly between fraudulent and valid account behavior, resulting in low capture rates and high false-positive rates.

Additionally, an effective fraud detection model generally requires more variables than conventional parameter analysis systems can handle. Furthermore, in order to capture new fraud schemes, parameter analysis systems must be redeveloped often, and automated redevelopment is difficult to implement.

It is desirable, therefore, to have an automated system that uses available information regarding cardholders, merchants, and transactions to screen transactions and isolate those which are likely to be fraudulent, and which captures a relatively high proportion of frauds while maintaining a relatively low false-positive rate. Preferably, such a system should be able to handle a large number of interdependent variables, and should have capability for re-development of the underlying system model as new patterns of fraudulent behavior emerge.

SUMMARY OF THE INVENTION

In accordance with the present invention, there is provided an automated system and method for detecting fraudulent transactions, which uses a predictive model such as a neural network to evaluate individual customer accounts and identify potentially fraudulent transactions based on learned relationships among known variables. These relationships enable the system to estimate a probability of fraud for each transaction. This probability may then be provided as output to a human decision-maker involved in processing the transaction, or the issuer may be signaled when the probability exceeds a predetermined amount. The system may also output reason codes that reveal the relative contributions of various factors to a particular result. Finally, the system periodically monitors its performance, and redevelops the model when performance drops below a predetermined level.

BRIEF DESCRIPTION OF THE DRAWINGS

FIG. 4 is a sample transaction analysis screen which forms part of a typical output interface for the present invention.

FIG. 21 is a portion of a typical CFG model definition file.

DESCRIPTION OF THE PREFERRED EMBODIMENT

The Figures depict preferred embodiments of the present invention for purposes of illustration only. One skilled in the art will readily recognize from the following discussion that alternative embodiments of the structures and methods illustrated herein may be employed without departing from the principles of the invention described herein.

Figure 1:
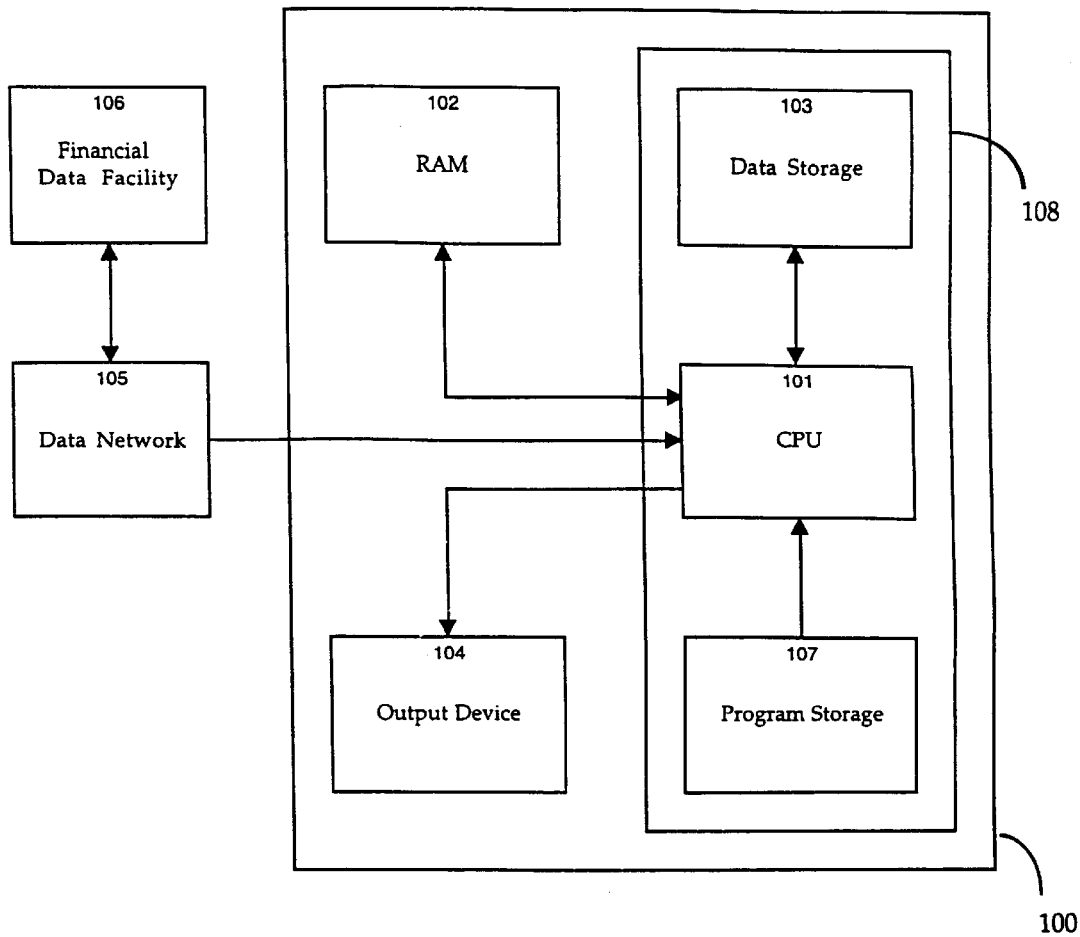
FIG. 1 is a block diagram of an implementation of the present invention.

Referring now to FIG. 1, there is shown a block diagram of a typical implementation of a system 100 in accordance with the present invention. Transaction information is applied to system 100 via data network 105, which is connected to a conventional financial data facility 106 collecting transaction information from conventional sources such as human-operated credit-card authorization terminals and automated teller machines (not shown). CPU 101 runs software program instructions, stored in program storage 107, which directs CPU 101 to perform the various functions of the system. In the preferred embodiment, the software program is written in the ANSI C language, which may be run on a variety of conventional hardware platforms. In accordance with the software program instructions, CPU 101 stores the data obtained from data network 105 in data storage 103, and uses RAM 102 in a conventional manner as a workspace. CPU 101, data storage 103, and program storage 107 operate together to provide a neural network model 108 for predicting fraud. After neural network 108 processes the information, as described below, to obtain an indication of the likelihood of fraud, a signal indicative of that likelihood is sent from CPU 101 to output device 104.

In the preferred embodiment, CPU 101 is a Model 3090 IBM mainframe computer, RAM 102 and data storage 103 are conventional RAM, ROM and disk storage devices for the Model 3090 CPU, and output device 104 is a conventional means for either printing results based on the signals generated by neural network 108, or displaying the results on a video screen using a window-based interface system, or sending the results to a database for later access, or sending a signal dependent on the results to an authorization system (not shown) for further processing.

Figure 2:
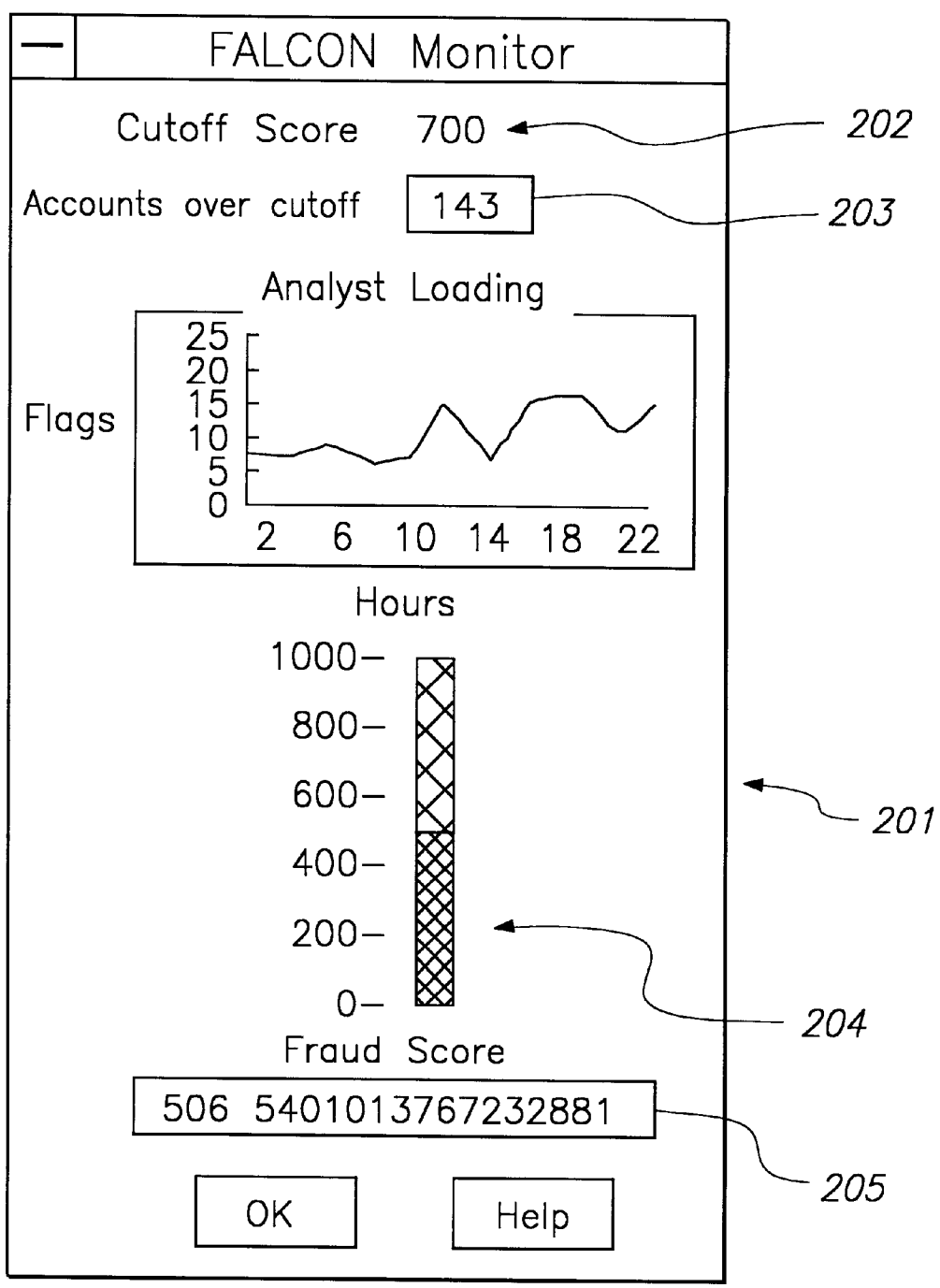
FIG. 2 is a sample system monitor screen which forms part of a typical output interface for the present invention.

Referring now also to FIGS. 2 through 6, there are shown sample screens from a conventional window-based interface system (not shown) which forms part of output device 104. FIG. 2 shows system monitor 201 that allows a fraud analyst or system supervisor to review system performance. System monitor 201 shows a cutoff score 202 above which accounts will be flagged, the number of accounts with scores above the cutoff 203, and the fraud score 204 and account number 205 for a particular account.

Figure 3:
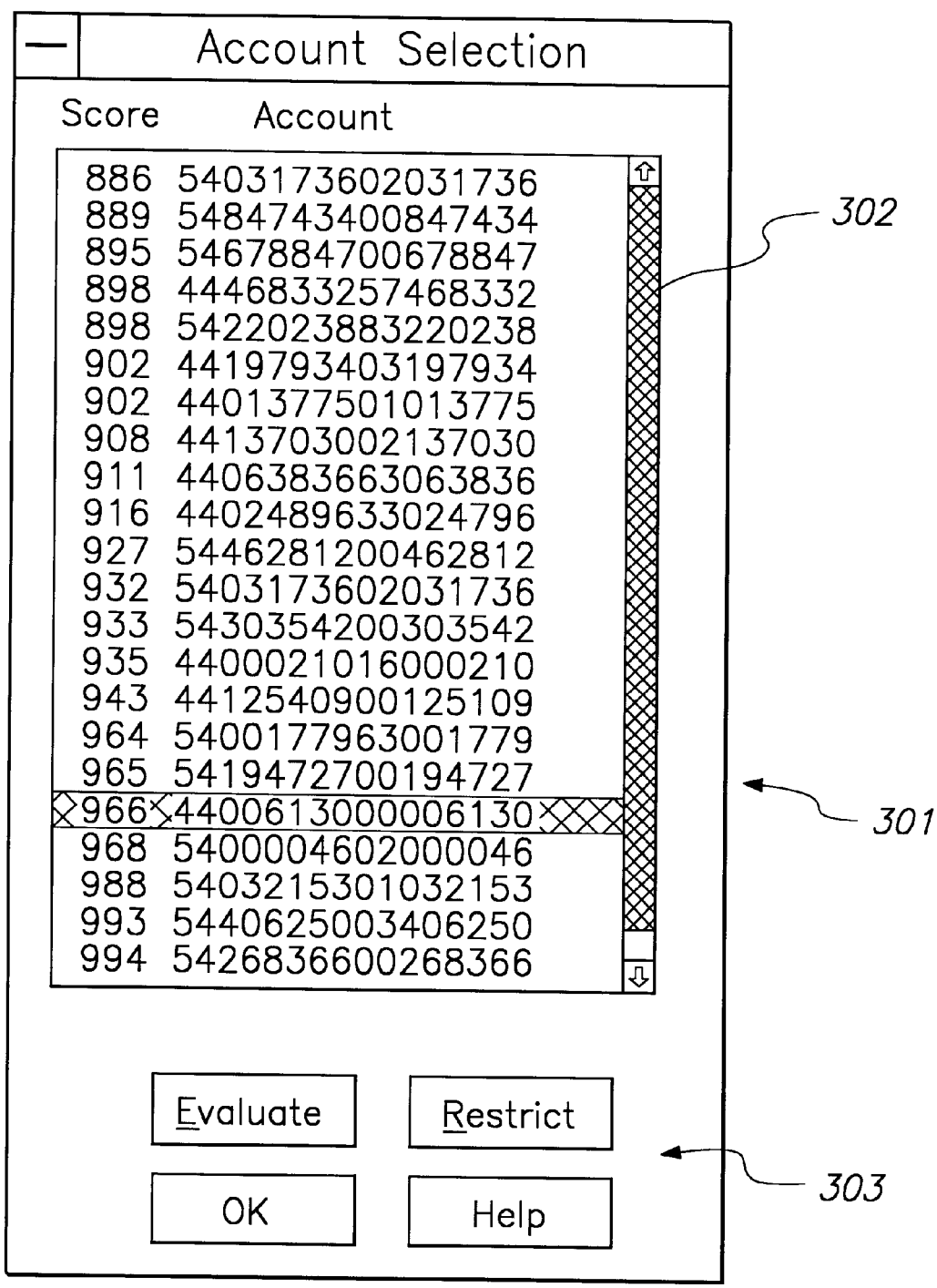
FIG. 3 is a sample account selection screen which forms part of a typical output interface for the present invention.

FIG. 3 shows account selection screen 301 that includes a scrolling window 302 allowing the analyst to select high-risk transactions for review, and a set of buttons 303 allowing the analyst to select further operations in connection with the selected transactions. FIG. 4 shows transaction analysis screen 401 that allows the fraud analyst to examine each high-risk transaction and determine appropriate fraud control actions. It includes account information 402, fraud score 403, explanations derived from reason codes 404 that indicate the reasons for fraud score 403, and two scrolling windows 405 and 406 that show transaction information for the current day and the past seven days 405, and for the past six months 406.

Figure 5:
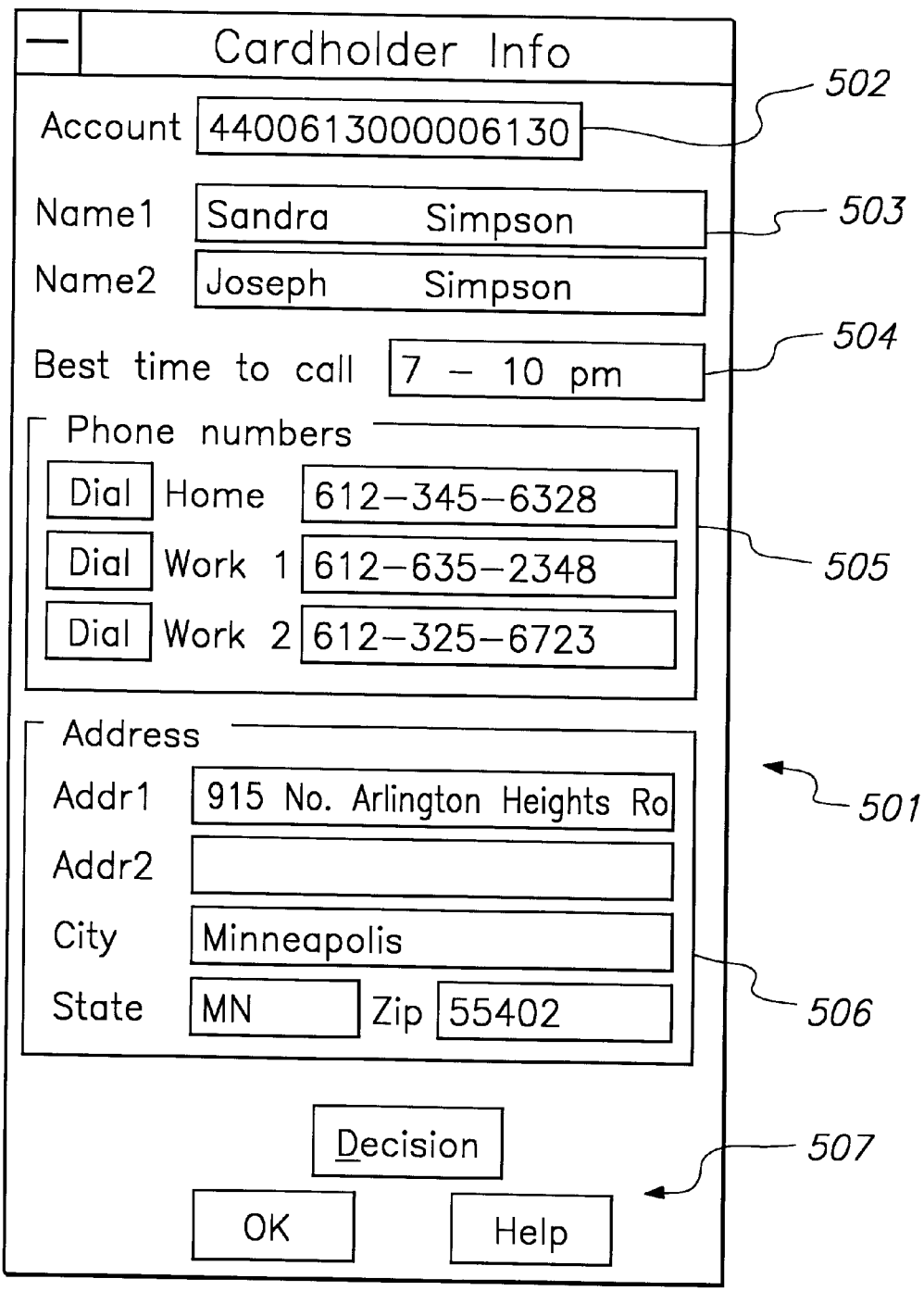
FIG. 5 is a sample customer information screen which forms part of a typical output interface for the present invention.

FIG. 5 shows customer information screen 501 that allows the analyst to access customer information, including account number 502, customer names 503, best time to call 504, phone numbers 505, and address 506. It also provides access to further functions via on-screen buttons 507.

Figure 6:
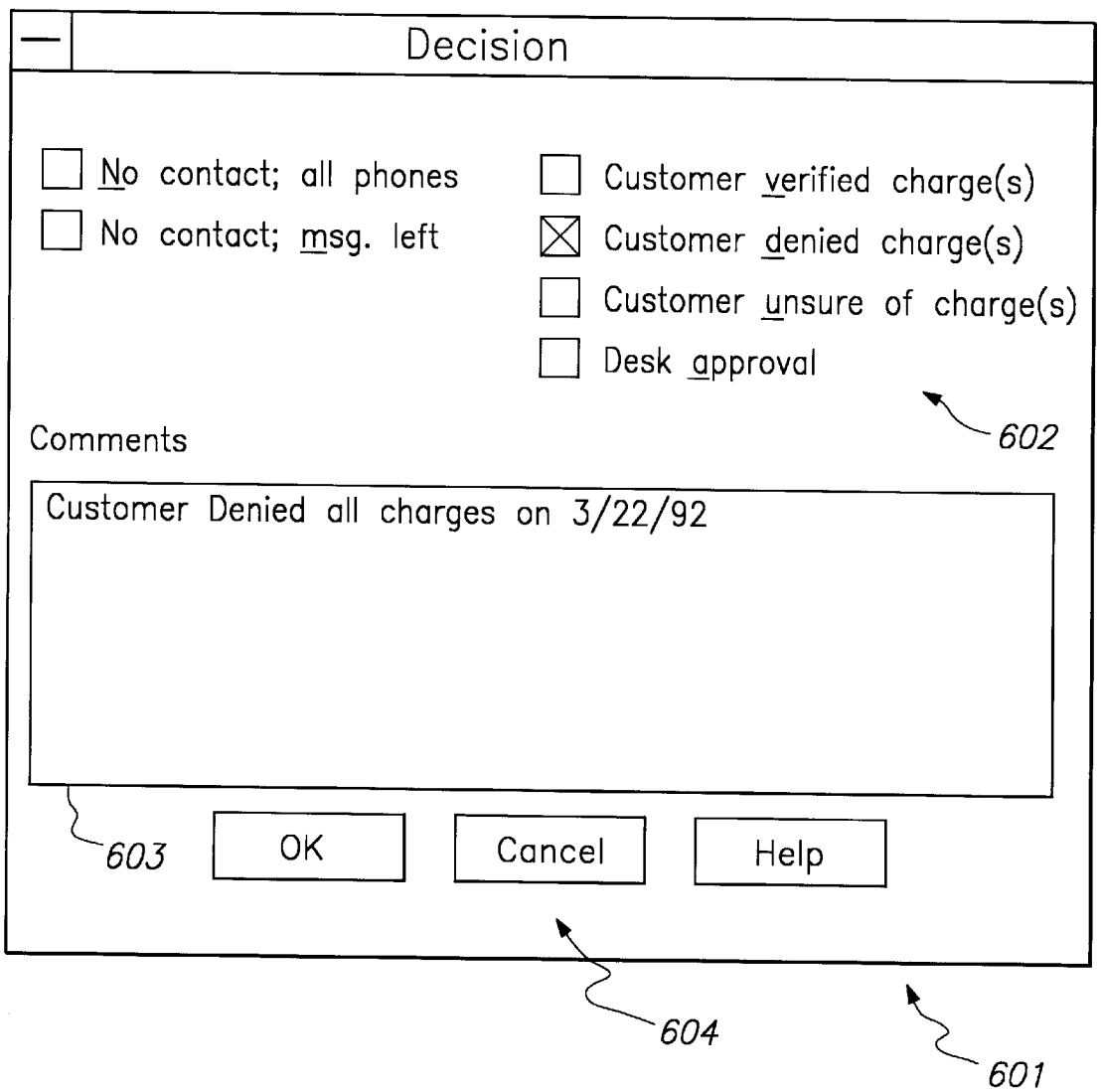
FIG. 6 is a sample analyst response screen which forms part of a typical output interface for the present invention.

FIG. 6 shows analyst response screen 601 that allows the analyst to log actions taken to control fraud. It includes a series of check boxes 602 for logging information, a comment box 603, and on-screen buttons 604 allowing access to other functions.

Figure 7:
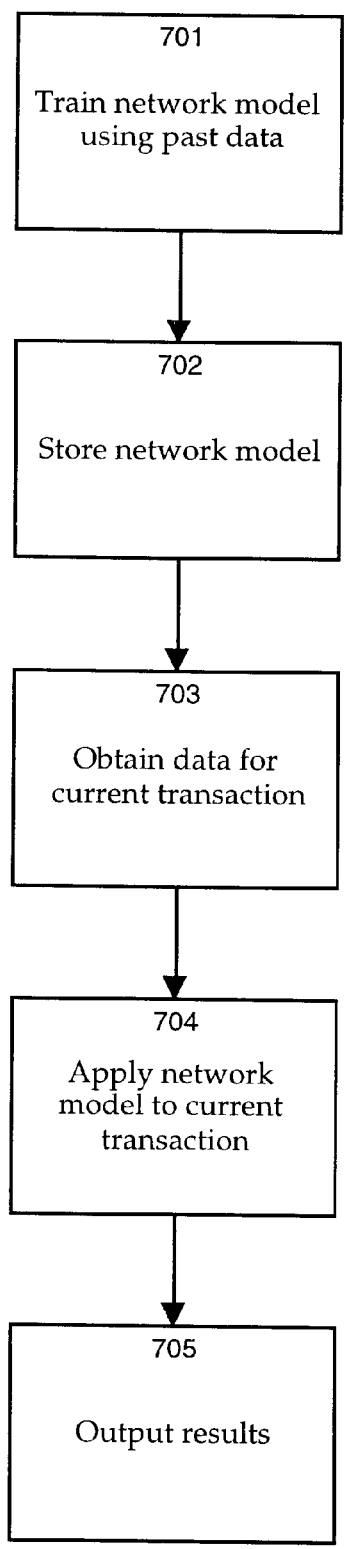
FIG. 7 is a flowchart illustrating the major functions and operation of the present invention.

Referring now also to FIG. 7, there is shown an overall flowchart illustrating the major functions and operation of the system 100. First neural network model 108 is trained 701 using data describing past transactions from data network 105. Then data describing the network model are stored 702. Once the model description is stored, system 100 is able to process current transactions. System 100 obtains data for a current transaction 703, and applies the current transaction data to the stored network model 704. The model 704 determines a fraud score and reason codes (described below), which are output 705 to the user, or to a database, or to another system via output device 104.

Figure 8:
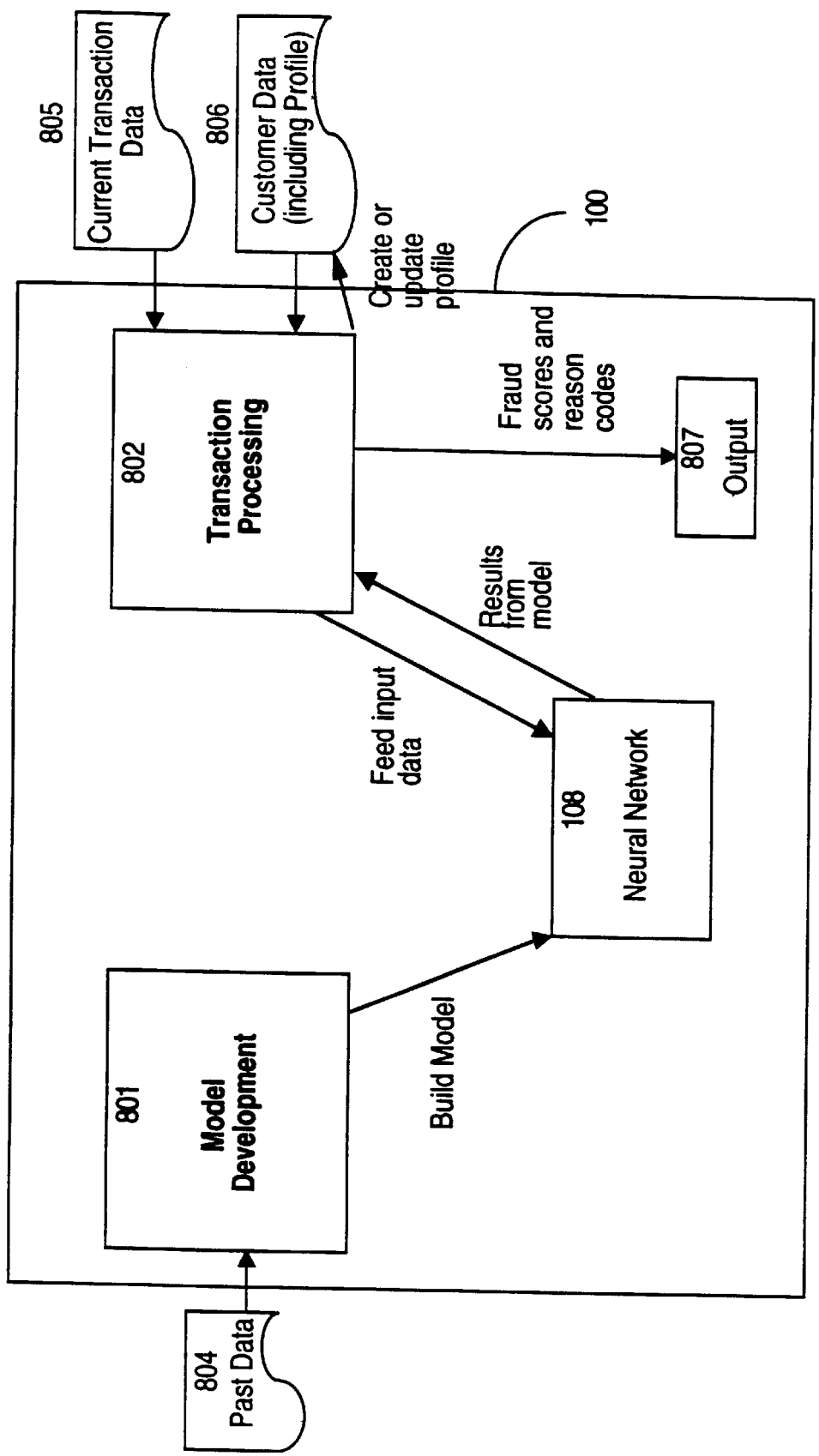
FIG. 8 is a block diagram showing the overall functional architecture of the present invention.

Referring now to FIG. 8, the overall functional architecture of system 100 is shown. System 100 is broken down into two major components: model development component 801 and transaction processing component 802. Model development component 801 uses past data 804 to build neural network 108 containing information representing learned relationships among a number of variables. Together, the learned relationships form a model of the behavior of the variables. Although a neural network is used in the preferred embodiment, any type of predictive modeling technique may be used. For purposes of illustration, the invention is described here in terms of a neural network.

Transaction processing component 802 performs three functions: 1) it determines the likelihood of fraud for each transaction by feeding data from various sources 805, 806 into neural network 108, obtaining results, and outputting them 807; 2) when applicable, it creates a record in a profile database 806 summarizing past transactional patterns of the customer; and 3) when applicable, it updates the appropriate record in profile database 806.

Each of the two components of the system will be described in turn.

Model Development Component 801

Neural Networks: Neural networks employ a technique of "learning" relationships through repeated exposure to data and adjustment of internal weights. They allow rapid model development and automated data analysis. Essentially, such networks represent a statistical modeling technique that is capable of building models from data containing both linear and non-linear relationships. While similar in concept to regression analysis, neural networks are able to capture nonlinearity and interactions among independent variables without pre-specification. In other words, while traditional regression analysis requires that nonlinearities and interactions be detected and specified manually, neural networks perform these tasks automatically. For a more detailed description of neural networks, see D. E. Rumelhart et al, "Learning Representations by Back-Propagating Errors", *Nature* v. 323, pp. 53–36 (1986), and R. Hecht-Nielsen, "Theory of the Backpropagation Neural Network", in *Neural Networks for Perception*. pp. 65–93 (1992), the teachings of which are incorporated herein by reference.

Figure 9:
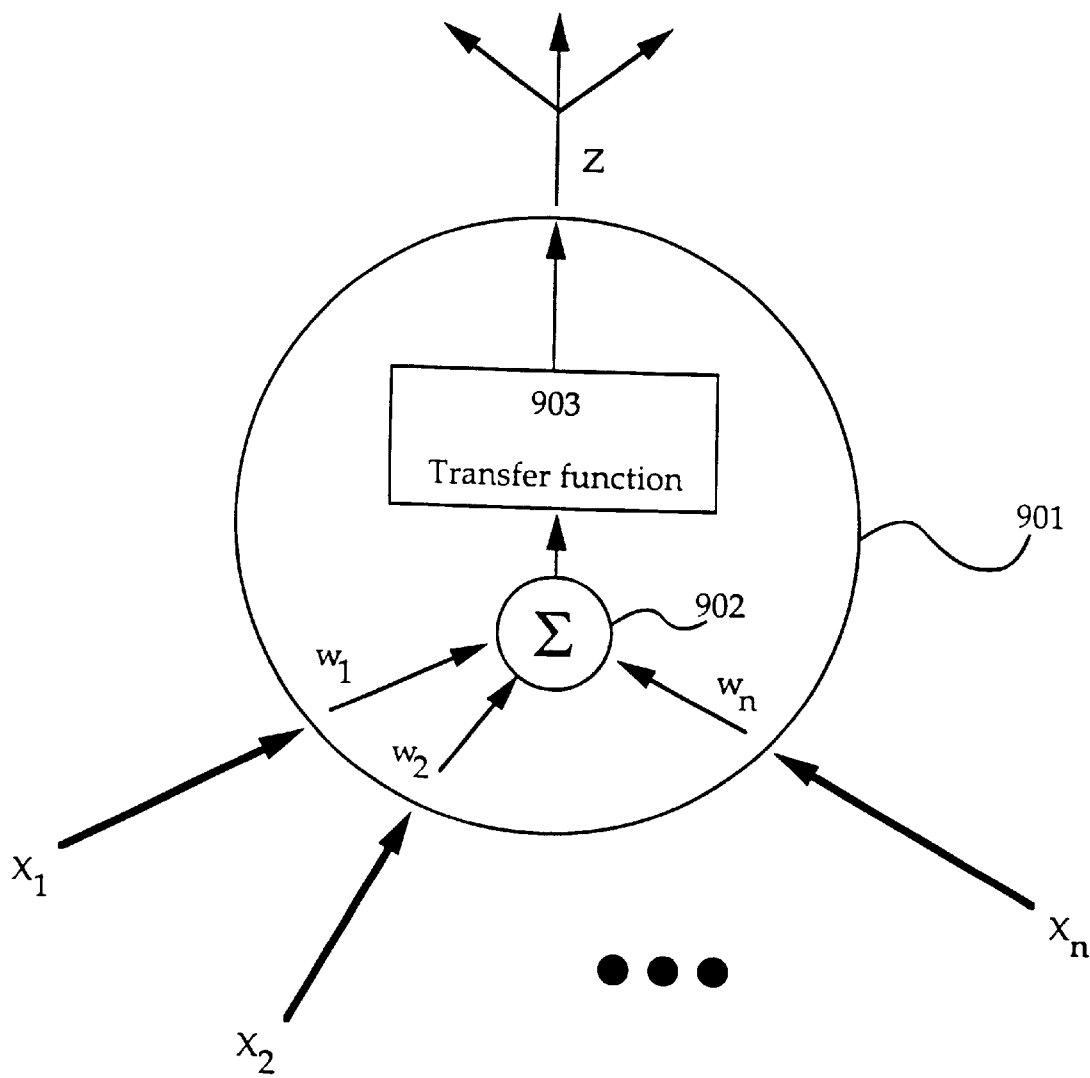
FIG. 9 is a diagram of a single processing element within a neural network.

Neural networks comprise a number of interconnected neuron-like processing elements that send data to each other along connections. The strengths of the connections among the processing elements are represented by weights. Referring now to FIG. 9, there is shown a diagram of a single processing element 901. The processing element receives inputs $X_1, X_2, \ldots X_n$, either from other processing elements or directly from inputs to the system. It multiplies each of its inputs by a corresponding weight $w_1, w_2 \ldots w_n$ and adds the results together to form a weighted sum 902. It then applies a transfer function 903 (which is typically non-linear) to the weighted sum, to obtain a value Z known as the state of the element. The state Z is then either passed on to another element along a weighted connection, or provided as an output signal. Collectively, states are used to represent information in the short term, while weights represent long-term information or learning.

Figure 10:
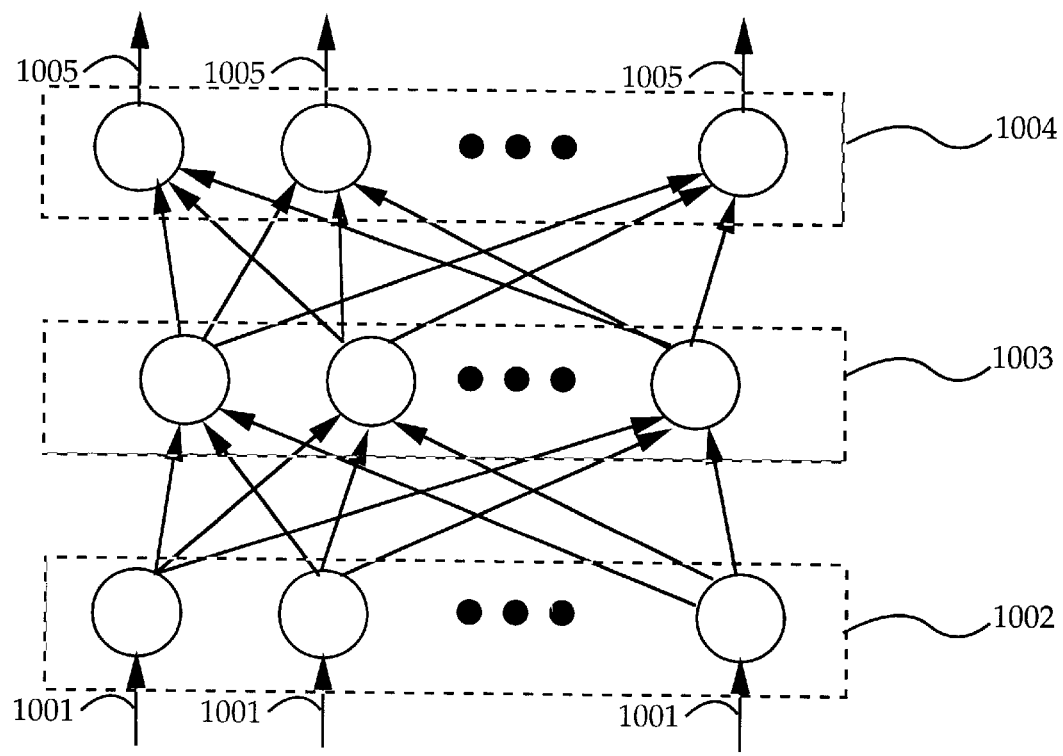
FIG. 10 is a diagram illustrating hidden processing elements in a neural network.

Processing elements in a neural network can be grouped into three categories: input processing elements (those which receive input data values); output processing elements (those which produce output values); and hidden processing elements (all others). The purpose of hidden processing elements is to allow the neural network to build intermediate representations that combine input data in ways that help the model learn the desired mapping with greater accuracy. Referring now to FIG. 10, there is shown a diagram illustrating the concept of hidden processing elements. Inputs 1001 are supplied to a layer of input processing elements 1002. The outputs of the input elements are passed to a layer of hidden elements 1003. Typically there are several such layers of hidden elements. Eventually, hidden elements pass outputs to a layer of output elements 1004, and the output elements produce output values 1005.

Neural networks learn from examples by modifying their weights. The "training" process, the general techniques of which are well known in the art, involves the following steps:

1) Repeatedly presenting examples of a particular input/output task to the neural network model;
2) Comparing the model output and desired output to measure error; and
3) Modifying model weights to reduce the error.

This set of steps is repeated until further iteration fails to decrease the error. Then, the network is said to be "trained." Once training is completed, the network can predict outcomes for new data inputs.

Fraud-Related Variables: In the present invention, data used to train the model are drawn from various database files containing historical data on individual transactions, merchants, and customers. These data are preferably pre-processed before being fed into the neural network, resulting in the creation of a set of fraud-related variables that have been empirically determined to form more effective predictors of fraud than the original historical data.

Figure 11:
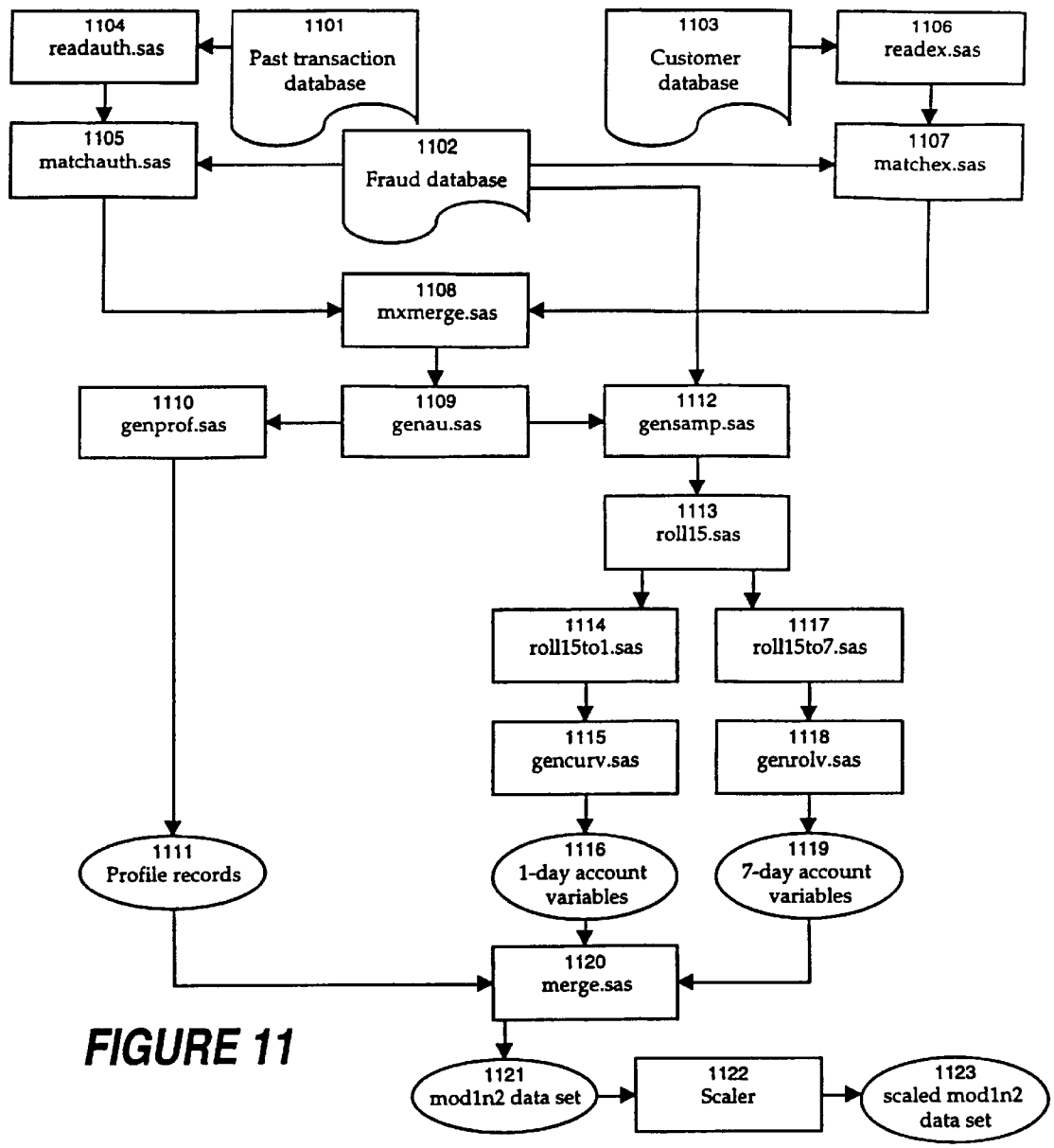
FIG. 11 is a flowchart of the pre-processing method of the present invention.

Referring now to FIG. 11, there is shown a flowchart of the pre-processing method of the present invention. Individual elements of the flowchart are indicated by designations which correspond to module names. The following brief description summarizes the pre-processing modules.

Data used for pre-processing is taken from three databases which contain past data: 1) past transaction database 1101 (also called an "authorization database") containing two years' worth of past transaction data, which may be implemented in the same data base as past data 804; 2) customer database 1103 containing customer data; and 3) fraud database 1102 which indicates which accounts had fraudulent activity and when the fraudulent activity occurred.

Module readauth.sas 1104 reads transaction data from past transaction database 1101. Module matchauth.sas 1105 samples this transaction data to obtain a new transaction data set containing all of the fraud accounts and a randomly-selected subset of the non-fraud accounts. In creating the new transaction data set, module matchauth.sas 1105 uses information from fraud database 1102 to determine which accounts have fraud and which do not. For effective network training, it has been found preferable to obtain approximately ten non-fraud accounts for every fraud account.

Module readex.sas 1106 reads customer data from customer database 1103. Module matchex.sas 1107 samples this customer data to obtain a new customer data set containing all of the fraud accounts and the same subset of non-fraud accounts as was obtained by module matchauth.sas 1105. In creating the new customer data set, module matchex.sas 1107 uses information from fraud database 1102 to determine which accounts have fraud and which do not.

Module mxmerge.sas 1108 merges all of the data sets obtained by modules matchauth.sas 1105 and matchex.sas 1107. Module genau.sas 1109 subdivides the merged data set into subsets of monthly data.

Module gensamp.sas 1112 samples the data set created by module mxmerge.sas 1108 and subdivided by genau.sas 1109, and creates a new data set called sample.ssd where each record represents a particular account on a particular day with transaction activity. Module gensamp.sas 1112 determines which records are fraudulent using information from fraud database 1102. Module gensamp.sas 1112 provides a subset of authorization days, as follows: From the database of all transactions, a set of active account-days is created by removing multiple transactions for the same customer on the same day. In the set of active account-days, each account day is assigned a "draft number" from 0 to 1. This draft number is assigned as follows: If the account-day is non-fraudulent, then the draft number is set to a random number between 0 and 1. If the account-day is fraudulent and it lies on the first or second day of fraud, then the draft number is set to 0. Otherwise, it is set to 1. Then, the 25,000 account-days with the smallest draft numbers are selected for inclusion in sample.ssd. Thus, all fraudulent account-days (up to 25,000) plus a sample of non-fraudulent account-days are included in sample.ssd.

Module roll15.sas 1113 generates a 15-day rolling window of data. This data has multiple records for each account-day listed in sample.ssd. The current day and 14 preceding days are listed for each sample account.

Module roll15to7.sas 1117 takes the roll15 data set and filters out days eight to 15 to produce roll7, a 7-day rolling window data set 1119. Days eight to 15 are ignored. Module genrolv.sas 1118 generates input variables for a rolling window of the previous 15 days of transactions. It processes a data set with multiple and variable numbers of records per account and produces a data set with one record per account. The result is called rollv.ssd.

Module roll15to1.sas 1114 takes the roll15 data set and filters out days except the current day to produce roll1. Module gencurv.sas 1115 uses roll1 to generate current day variables 1116 describing transactions occurring during the current day.

Module genprof.sas generates profile variables which form the profile records 1111.

Module merge.sas 1120 combines the profile records 1111, 1-day variables 1116, and 7-day variables 1119 and generates new fraud-related variables, as listed below, from the combination. It also merges rollv.ssd with the sample-filtered profile data sets to produce a single data set with both profile and rolling window variables. The result is called the mod1n2 data set 1121 (also called the "training set"), which contains the fraud-related variables needed to train the network. Scaler module 1122 scales the variables such that the mean value for each variable in the scaled training set is 0.0 and the standard deviation is 1.0, to create scaled mod1n2 data set 1123.

Many fraud-related variables may be generated using variations of the pre-processing method described above. Fraud-related variables used in the preferred embodiment include:

Customer usage pattern profiles representing time-of-day and day-of-week profiles;

Expiration date for the credit card;

Dollar amount spent in each SIC (Standard Industrial Classification) merchant group category during the current day;

Percentage of dollars spent by a customer in each SIC merchant group category during the current day;

Number of transactions in each SIC merchant group category during the current day;

Percentage of number of transactions in each SIC merchant group category during the current day;

Categorization of SIC merchant group categories by fraud rate (high, medium, or low risk);

Categorization of SIC merchant group categories by customer types (groups of customers that most frequently use certain SIC categories);

Categorization of geographic regions by fraud rate (high, medium, or low risk);

Categorization of geographic regions by customer types;

Mean number of days between transactions;

Variance of number of days between transactions;

Mean time between transactions in one day;

Variance of time between transactions in one day;

Number of multiple transaction declines at same merchant;

Number of out-of-state transactions;

Mean number of transaction declines;

Year-to-date high balance;

Transaction amount;

Transaction date and time;

Transaction type.

Additional fraud-related variables which may also be considered are listed below:

```
Current Day Cardholder Fraud Related Variables
bweekend    current day boolean indicating current datetime considered weekend
cavapvdl    current day mean dollar amount for an approval
cavapvdl    current day mean dollar amount for an approval
cavaudl     current day mean dollars per auth across day
ccoscdom    current day cosine of the day of month i.e. cos(day ((datepart(cst_dt)*&TWOPI)/30));
ccoscdow    current day cosine of the day of week i.e. cos(weekday((datepart(cst_dt)*&TWOPI)/7));
ccoscmoy    current day cosine of the month of year i.e. cos(month ((datepart(cst_dt)*&TWOPI)/12));
cdom        current day day of month
cdow        current day day of week
chdzip      current cardholder zip
chibal      current day high balance
chidcapv    current day highest dollar amt on a single cash approve
chidcdec    current day highest dollar amt on a single cash decline
chidmapv    current day highest dollar amt on a single merch approve
chidmdec    current day highest dollar amt on a single merch decline
chidsapv    current day highest dollar amount on a single approve
chidsau     current day highest dollar amount on a single auth
chidsdec    current day highest dollar amount on a single decline
cmoy        current day month of year
cratdcau    current day ratio of declines to auths
csincdom    current day sine of the day of month i.e. sin(day ((datepart(cst_dt)*&TWOPI/130));
csincdow    current day sine of the day of week i.e. sin(weekday((datepart(cst_dt)*&TWOPI)/7));
csincmoy    current day sine of the month of year i.e. sin(month ((datepart(cst_dt)*&TWOPI)/12));
cst_dt      current day cst datetime derived from zip code and CST auth time
ctdapv      current day total dollars of approvals
ctdau       current day total dollars of auths
ctdcsapv    current day total dollars of cash advance approvals
ctdcsdec    current day total dollars of cash advance declines
```

-continued

| | |
|---|---|
| ctddec | current day total dollars of declines |
| ctdmrapv | current day total dollars of merchandise approvals |
| ctdmrdec | current day total dollars of merchandise declines |
| ctnapv | current day total number of approves |
| ctnau | current day total number of auths |
| ctnau10d | current day number of auths in day<=$10 |
| ctnaudy | current day total number of auths in a day |
| ctncsapv | current day total number of cash advance approvals |
| ctncsapv | current day total number of cash approves |
| ctncsdec | current day total number of cash advance declines |
| ctndec | current day total number of declines |
| ctnmrapv | current day total number of merchandise approvals |
| ctnmrdec | current day total number of merchandise declines |
| ctnsdapv | current day total number of approvals on the same day of week as current day |
| ctnwdaft | current day total number of weekday afternoon approvals |
| ctnwdapv | current day total number of weekday approvals |
| ctnwdeve | current day total number of weekday evening approvals |
| ctnwdmor | current day total number of weekday morning approvals |
| ctnwdnit | current day total number of weekday night approvals |
| ctnweaft | current day total number of weekend afternoon approvals |
| ctnweapv | current day total number of weekend approvals |
| ctnweeve | current day total number of weekend evening approvals |
| ctnwemor | current day total number of weekend morning approvals |
| ctnwenit | current day total number of weekend night approvals |
| currbal | current day current balance |
| cvrandl | current day variance of dollars per auth across day |
| czrate1 | current day zip risk group 1 Zip very high fraud rate' |
| czrate2 | current day zip risk group 2 Zip high fraud rate' |
| czrate3 | current day zip risk group 3 Zip medium high fraud rate' |
| czrate4 | current day zip risk group 4 Zip medium fraud rate' |
| czrate5 | current day zip risk group 5 Zip medium low fraud rate' |
| czrate6 | current day zip risk group 6 Zip low fraud rate' |
| czrate7 | current day zip risk group 7 Zip very low fraud rate' |
| czrate8 | current day zip risk group 8 Zip unknown fraud rate' |
| ctdsfa01 | current day total dollars of transactions in SIC factor group 01 |
| ctdsfa02 | current day total dollars of transactions in SIC factor group 02 |
| ctdsfa03 | current day total dollars of transactions in SIC factor group 03 |
| ctdsfa04 | current day total dollars of transactions in SIC factor group 04 |
| ctdsfa05 | current day total dollars of transactions in SIC factor group 05 |
| ctdsfa06 | current day total dollars of transactions in SIC factor group 06 |
| ctdsfa07 | current day total dolars of transactions in SIC factor group 07 |
| ctdsfa08 | current day total dollars of transactions in SIC factor group 08 |
| ctdsfa09 | current day total dollars of transactions in SIC factor group 09 |
| ctdsfa10 | current day total dollars of transactions in SIC factor group 10 |
| ctdsfa11 | current day total doflars of transactions in SIC factor group 11 |
| ctdsra01 | current day total dollars of transactions in SIC fraud rate group 01 |
| ctdsra02 | current day total dollars of transactions in SIC fraud rate group 02 |
| ctdsra03 | current day total dollars of transactions in SIC fraud rate group 03 |
| ctdsra04 | current day total dollars of transactions in SIC fraud rate group 04 |
| ctdsra05 | current day total dollars of transactions in SIC fraud rate group 05 |
| ctdsra06 | current day total dollars of transactions in SIC fraud rate group 06 |
| ctdsra07 | current day total dollars of transactions in SIC fraud rate group 07 |
| ctdsva01 | current day total dollars in SIC VISA group 01 |
| ctdsva02 | current day total dollars in SIC VISA group 02 |
| ctdsva03 | current day total dollars in SIC VISA group 03 |
| ctdsva04 | current day total dollars in SIC VISA group 04 |
| ctdsva05 | current day total dollars in SIC VISA group 05 |
| ctdsva06 | current day total dollars in SIC VISA group 06 |
| ctdsva07 | current day total dollars in SIC VISA group 07 |
| ctdsva08 | current day total dollars in SIC VISA group 08 |
| ctdsva09 | current day total dollars in SIC VISA group 09 |
| ctdsva10 | current day total dollars in SIC VISA group 10 |
| ctdsva11 | current day total dollars in SIC VISA group 11 |
| ctnsfa01 | current day total number of transactions in SIC factor group 01 |
| ctnsfa02 | current day total number of transactions in SIC factor group 02 |
| ctnsfa03 | current day total number of transactions in SIC factor group 03 |
| ctnsfa04 | current day total number of transactions in SIC factor group 04 |
| ctnsfa05 | current day total number of transactions in SIC factor group 05 |
| ctnsfa06 | current day total number of transactions in SIC factor group 06 |
| ctnsfa07 | current day total number of transactions in SIC factor group 07 |
| ctnsfa08 | current day total number of transactions in SIC factor group 08 |
| ctnsfa09 | current day total number of transactions in SIC factor group 09 |
| ctnsfa10 | current day total number of transactions in SIC factor group 10 |
| ctnsfa11 | current day total number of transactions in SIC factor group 11 |
| ctnsra01 | current day total number of transactions in SIC fraud rate group 01 |
| ctnsra02 | current day total number of transactions in SIC fraud rate group 02 |
| ctnsra03 | current day total number of transactions in SIC fraud rate group 03 |
| ctnsra04 | current day total number of transactions in SIC fraud rate group 04 |
| ctnsra05 | current day total number of transactions in SIC fraud rate group 05 |

-continued

| | |
|---|---|
| ctnsra06 | current day total number of transactions in SIC fraud rate group 06 |
| ctnsra07 | current day total number of transactions in SIC fraud rate group 07 |
| ctnsva01 | current day total number in SIC VISA group 01 |
| ctnsva02 | current day total number in SIC VISA group 02 |
| ctnsva03 | current day total number in SIC VISA group 03 |
| ctnsva04 | current day total number in SIC VISA group 04 |
| ctnsva05 | current day total number in SIC VISA group 05 |
| ctnsva06 | current day total number in SIC VISA group 06 |
| ctnsva07 | current day total number in SIC VISA group 07 |
| ctnsva08 | current day total number in SIC VISA group 08 |
| ctnsva09 | current day total number in SIC VISA group 09 |
| ctnsva10 | current day total number in SIC VISA group 10 |
| ctnsva11 | current day total number in SIC VISA group 11 |
| 7 Day Cardholder Fraud Related Variables | |
| raudymdy | 7 day ratio of auth days over number of days in the window |
| ravapvdl | 7 day mean dollar amount for an approval |
| ravaudl | 7 day mean dollars per auth across window |
| rddapv | 7 day mean doflars per day of approvals |
| rddapv2 | 7 day mean dollars per day of approvals on days with auths |
| rddau | 7 day mean dollars per day of auths on days with auths |
| rddauall | 7 day mean dollars per day of auths on all days in window |
| rddcsapv | 7 day mean dollars per day of cash approvals |
| rddcsdec | 7 day mean dollars per day of cash declines |
| rdddec | 7 day mean dollars per day of declines |
| rdddec2 | 7 day mean dollars per day of declines on days with auths |
| rddmrapv | 7 day mean dollars per day of merchandise approvals |
| rddmrdec | 7 day mean dollars per day of merchandise declines |
| rdnapv | 7 day mean number per day of approvals |
| rdnau | 7 day mean number per day of auths on days with auths |
| rdnauall | 7 day mean number per day of auths on all days in window |
| rdncsapv | 7 day mean number per day of cash approvals |
| rdncsdec | 7 day mean number per day of cash declines |
| rdndec | 7 day mean number per day of declines |
| rdnmrapv | 7 day mean number per day of merchandise approvals |
| rdnmrdec | 7 day mean number per day of merchandise declines |
| rdnsdap2 | 7 day mean number per day of approvals on same day of week calculated only for those days which had approvals |
| rdnsdapv | 7 day mean number per day of approvals on same day of week as current day |
| rdnwdaft | 7 day mean number per day of weekday afternoon approvals |
| rdnwdapv | 7 day mean number per day of weekday approvals |
| rdnwdeve | 7 day mean number per day of weekday evening approvals |
| rdnwdrnor | 7 day mean number per day of weekday morning approvals |
| rdnwdnit | 7 day mean number per day of weekday night approvals |
| rdnweaft | 7 day mean number per day of weekend afternoon approvals |
| rdnweapv | 7 day mean number per day of weekend approval |
| rdnweeve | 7 day mean number per day of weekend evening approvals |
| rdnwemor | 7 day mean number per day of weekend morning approvals |
| rdnwenit | 7 day mean number per day of weekend night approvals |
| rhibal | 7 day highest window balance |
| rhidcapv | 7 day highest dollar amt on a single cash approve |
| rhidcdec | 7 day highest dollar amt on a single cash decline |
| rhidmapv | 7 day highest dollar amt on a single merch approve |
| rhidmdec | 7 day highest dollar amt on a single merch decline |
| rhidsapv | 7 day highest dollar amount on a single approve |
| rhidsau | 7 day highest dollar amount on a single auth |
| rhidsdec | 7 day highest dollar amount on a single decline |
| rhidtapv | 7 day highest total dollar amount for an approve in a single day |
| rhidtau | 7 day highest total dollar amount for any auth in a single day |
| rhidtdec | 7 day highest total dollar amount for a decline in a single day |
| rhinapv | 7 day highest number of approves in a single day |
| rhinau | 7 day highest number of auths in a single day |
| rhindec | 7 day highest number of declines in a single day |
| rnaudy | 7 day number of days in window with any auths |
| rnausd | 7 day number of same day of week with any auths |
| rnauwd | 7 day number of weekday days in window with any auths |
| rnauwe | 7 day number of weekend days in window with any auths |
| rncsandy | 7 day number of days in window with cash auths |
| rnmraudy | 7 day number of days in window with merchant auths |
| rtdapv | 7 day total dollars of approvals |
| rtdau | 7 day total dollars of auths |
| rtdcaapv | 7 day total dollars of cash advance approvals |
| rtdcadec | 7 day total dollars of cash advance declines |
| rtddec | 7 day total dollars of declines |
| rtdmrapv | 7 day total dollars of merchandise approvals |
| rtdmrdec | 7 day total dollars of merchandise declines |
| rtnapv | 7 day total number of approvals |
| rtnapvdy | 7 day total number of approves in a day |
| rtnau | 7 day total number of auths |
| rtnau10d | 7 day number ofauths in window <=$10 |

-continued

| | |
|---|---|
| rtncsapv | 7 day total number of cash advance approvals |
| rtncsdec | 7 day total number of cash advance declines |
| rtndec | 7 day total number of declines |
| rtnmrapv | 7 day total number of merchandise approvals |
| rtnmrdec | 7 day total number of merchandise declines |
| rtnsdapv | 7 day total number of approvals on the same day of week as current day |
| rtnwdaft | 7 day total number of weekday afternoon approvals |
| rtnwdapv | 7 day total number of weekday approvals |
| rtnwdeve | 7 day total number of weekday evening approvals |
| rtnwdmor | 7 day total number of weekday morning approvals |
| rtnwdnit | 7 day total number of weekday night approvals |
| rtnweaft | 7 day total number of weekend afternoon approvals |
| rtnweapv | 7 day total number of weekend approvals |
| rtnweeve | 7 day total number of weekend evening approvals |
| rtnwemor | 7 day total number of weekend morning approvals |
| rtnwenit | 7 day total number of weekend night approvals |
| rvraudl | 7 day variance of dollars per auth across window |
| Profile Cardholder Fraud Related Variables | |
| paudymdy | profile ratio of auth days over number of days in the month |
| pavapvdl | profile mean dollar amount for an approval |
| pavaudl | profile mean dollars per auth across month |
| pchdzip | profile the last zip of the cardholder |
| pdbm | profile value of 'date became member' at time of last profile update |
| pddapv | profile daily mean dollars of approvals |
| pddapv2 | profile daily mean dollars of approvals on days with auths |
| pddau | profile daily mean dollars of auths on days with auths |
| pddau30 | profile daily mean dollars of auths on all days in month |
| pddcsapv | profile daily mean dollars of cash approvals |
| pddcsdec | profile daily mean dollars of cash declines |
| pdddec | profile daily mean dollars of declines |
| pdddec2 | profile daily mean dollars of declines on days with auths |
| pddmrapv | profile daily mean dollars of merchandise approvals |
| pddrnrdec | profile daily mean dollars of merchandise declines |
| pdnapv | profile daily mean number of approvals |
| pdnau | profile daily mean number of auths on days with auths |
| pdnau30 | profile daily mean number of auths on all days in month |
| pdncsapv | profile daily mean number of cash approvals |
| pdncsdec | profile daily mean number of cash declines |
| pdndec | profile daily mean number of declines |
| pdnmrapv | profile daily mean number of merchandise approvals |
| pdnmrdec | profile daily mean number of merchandise declines |
| pdnw1ap2 | profile mean number of approvals on Sundays which had auths |
| pdnw1apv | profile mean number of approvals on Sundays (day 1 of week) |
| pdnw2ap2 | profile mean number of approvals on Mondays which had auths |
| pdnw2apv | profile mean number of approvals on Mondays (day 2 of week) |
| pdnw3ap2 | profile mean number of approvals on Tuesdays which had auths |
| pdnw3apv | profile mean number of approvals on Tuesdays (day 3 of week) |
| pdnw4ap2 | profile mean number of approvals on Wednesdays which had auths |
| pdnw4apv | profile mean number of approvals on Wednesdays (day 4 of week) |
| pdnw5ap2 | profile mean number of approvals on Thursdays which had auths |
| pdnw5apv | profile mean number of approvals on Thursdays (day 5 of week) |
| pdnw6ap2 | profile mean number of approvals on Fridays which had auths |
| pdnw6apv | profile mean number of approvals on Fridays (day 6 of week) |
| pdnw7ap2 | profile mean number of approvals on Saturdays which had auths |
| pdnw7apv | profile mean number of approvals on Saturdays (day 7 of week) |
| pdnwdaft | profile daily mean number of weekday afternoon approvals |
| pdnwdapv | profile daily mean number of weekday approvals |
| pdnwdeve | profile daily mean number of weekday evening approvals |
| pdnwdmor | profile daily mean number of weekday morning approvals |
| pdnwdnit | profile daily mean number of weekday night approvals |
| pdnweaft | profile daily mean number of weekend afternoon approvals |
| pdnweapv | profile daily mean number of weekend approvals |
| pdnweeve | profile daily mean number of weekend evening approvals |
| pdnwemor | profile daily mean number of weekend morning approvals |
| pdnwenit | profile daily mean number of weekend night approvals |
| pexpir | profile expiry date stored in profile; update if curr date>pexpir |
| phibal | profile highest monthly balance |
| phidcapv | profile highest dollar amt on a single cash approve in a month |
| phidcdec | profile highest dollar amt on a single cash decline in a month |
| phidmapv | profile highest dollar amt on a single merch approve in a month |
| phidmdec | profile highest dollar amt on a single merch decline in a month |
| phidsapv | profile highest dollar amount on a single approve in a month |
| phidsau | profile highest dollar amount on a single auth in a month |
| phidsdec | profile highest dollar amount on a single decline in a month |
| phidtapv | profile highest total dollar amount for an approve in a single day |
| phidtau | profile highest total dollar amount for any auth in a single day |
| phidtdec | profile highest total dollar amount for a decline in a single day |
| phinapv | profile highest number of approves in a single day |
| phinau | profile highest number of auths in a single day |

-continued

| | |
|---|---|
| phindec | profile highest number of declines in a single day |
| pm1avbal | profile average bal. during 1st 10 days of mo. |
| pm1nauths | profile number of auths in the 1st 10 days of mo. |
| pm2avbal | profile average bal. during 2nd 10 days of mo. |
| pm2nauths | profile number of auths in the 2nd 10 days of mo. |
| pm3avbal | profile average bal. during remaining days |
| pm3nauths | profile number of auths in the last part of the month. |
| pmovewt | profile uses last zip to determine recent residence move; pmovewt=2 for a move within the previous calendar month; pmovew |
| pnaudy | profile number of days with auths |
| pnauw1 | profile number of Sundays in month with any auths |
| pnauw2 | profile number of Mondays in month with any auths |
| pnauw3 | profile number of Tuesdays in month with any auths |
| pnauw4 | profile number of Wednesdays in month with any auths |
| pnauw5 | profile number of Thursdays in month with any auths |
| pnauw6 | profile number of Fridays in month with any auths |
| pnauw7 | profile number of Saturdays in month with any auths |
| pnauwd | profile number of weekday days in month with any auths |
| pnauwe | profile number of weekend days in month with any auths |
| pncsaudy | profile number of days in month with cash auths |
| pnmraudy | profile number of days in month with merchant auths |
| pnweekday | profile number of weekday days in the month |
| pnweekend | profile number of weekend days in the month |
| pratdcau | profile ratio of declines to auths |
| profage | profile number of months this account has had a profile (up to 6 mo.) |
| psdaudy | profile standard dev. of # days between transactions in a month |
| psddau | profile standard dev. of $ per auth in a month |
| ptdapv | profile total dollars of approvals in a month |
| ptdau | profile total dollars of auths in a month |
| ptdaudy | profile total dollars of auths in a day |
| ptdcsapv | profile total dollars of cash advance approvals in a month |
| ptdcsdec | profile total dollars of cash advance declines in a month |
| ptddec | profile total dollars of declines in a month |
| ptdmrapv | profile total dollars of merchandise approvals in a month |
| ptdrmdec | profile total dollars of merchandise declines in a month |
| ptdsfa01 | profile total dollars of transactions in SIC factor group 01 |
| ptdsfa02 | profile total dollars of transactions in SIC factor group 02 |
| ptdsfa03 | profile total dollars of transactions in SIC factor group 03 |
| ptdsfa04 | profile total dollars of transactions in SIC factor group 04 |
| ptdsfa05 | profile total dollars of transactions in SIC factor group 05 |
| ptdsfa06 | profile total dollars of transactions in SIC factor group 06 |
| ptdsfa07 | profile total dollars of transactions in SIC factor group 07 |
| ptdsfa08 | profile total dollars of transactions in SIC factor group 08 |
| ptdsfa09 | profile total dollars of transactions in SIC factor group 09 |
| ptdsfa10 | profile total dollars of transactions in SIC factor group 10 |
| ptdsfa11 | profile total dollars of transactions in SIC factor group 11 |
| ptdsra01 | profile total dollars of transactions in SIC fraud rate group 01 |
| ptdsra02 | profile total dollars of transactions in SIC fraud rate group 02 |
| ptdsra03 | profile total dollars of transactions in SIC fraud rate group 03 |
| ptdsra04 | profile total dollars of transactions in SIC fraud rate group 04 |
| ptdsra05 | profile total dollars of transactions in SIC fraud rate group 05 |
| ptdsra06 | profile total dollars of transactions in SIC fraud rate group 06 |
| ptdsra07 | profile total doflars of transactions in SIC fraud rate group 07 |
| ptdsva01 | profile total dollars in SIC VISA group 01 |
| ptdsva02 | profile total dollars in SIC VISA group 02 |
| ptdsva03 | profile total dollars in SIC VISA group 03 |
| ptdsva04 | profile total dollars in SIC VISA group 04 |
| ptdsva05 | profile total dollars in SIC VISA group 05 |
| ptdsva06 | profile total dollars in SIC VISA group 06 |
| ptdsva07 | profile total dollars in SIC VISA group 07 |
| ptdsva08 | profile total dollars in SIC VISA group 08 |
| ptdsva09 | profile total dollars in SIC VISA group 09 |
| ptdsva10 | profile total dollars in SIC VISA group 10 |
| ptdsva11 | profile total dollars in SIC VISA group 11 |
| ptnapv | profile total number of approvals in a month |
| ptnapvdy | profile total number of approves a day |
| ptnau | profile total number of auths in a month |
| ptnau10d | profile number of auths in month <=$10 |
| ptnaudy | profile total number of auths in a day |
| ptncsapv | profile total number of cash advance approvals in a month |
| ptncsdec | profile total number of cash advance declines in a month |
| ptndec | profile total number of declines in a month |
| ptndecdy | profile total number of declines in a day |
| ptnmrapv | profile total number of merchandise approvals in a month |
| ptnmrdec | profie total number of merchandise declines in a month |
| ptnsfa01 | profile total number of transactions in SIC factor group 01 |
| ptnsfa02 | profile total number of transactions in SIC factor group 02 |
| ptnsfa03 | profile total number of transactions in SIC factor group 03 |
| ptnsfa04 | profile total number of transactions in SIC factor group 04 |

-continued

| | |
|---|---|
| ptnsfa05 | profile total number of transactions in SIC factor group 05 |
| ptnsfa06 | profile total number of transactions in SIC factor group 06 |
| ptnsfa07 | profile total number of transactions in SIC factor group 07 |
| ptnsfa08 | profile total number of transactions in SIC factor group 08 |
| ptnsfa09 | profile total number of transactions in SIC factor group 09 |
| ptnsfa10 | profile total number of transactions in SIC factor group 10 |
| ptnsfa11 | profile total number of transactions in SIC factor group 11 |
| ptnsra01 | profile total number of transactions in SIC fraud rate group 01 |
| ptnsra02 | profile total number of transactions in SIC fraud rate group 02 |
| ptnsra03 | profile total number of transactions in SIC fraud rate group 03 |
| ptnsra04 | profile total number of transactions in SIC fraud rate group 04 |
| ptnsra05 | profile total number of transactions in SIC fraud rate group 05 |
| ptnsra06 | profile total number of transactions in SIC fraud rate group 06 |
| ptnsra07 | profile total number of transactions in SIC fraud rate group 07 |
| ptnsva01 | profile total number in SIC VISA group 01 |
| ptnsva02 | profile total number in SIC VISA group 02 |
| ptnsva03 | profile total number in SIC VISA group 03 |
| ptnsva04 | profile total number in SIC VISA group 04 |
| ptnsva05 | profile total number in SIC VISA group 05 |
| ptnsva06 | profile total number in SIC VISA group 06 |
| ptnsva07 | profile total number in SIC VISA group 07 |
| ptnsva08 | profile total number in SIC VISA group 08 |
| ptnsva09 | profile total number in SIC VISA group 09 |
| ptnsva10 | profile total number in SIC VISA group 10 |
| ptnsva11 | profile total number in SIC VISA group 11 |
| ptnw1apv | profile total number of approvals on Sundays (day 1 of week) |
| ptnw2apv | profile total number of approvals on Mondays (day 2 of week) |
| ptnw3apv | profile total number of approvals on Tuesdays (day 3 of week) |
| ptnw4apv | profile total number of approvals on Wednesdays (day 4 of week) |
| ptnw5apv | profile total number of approvals on Thursdays (day 5 of week) |
| ptnw6apv | profile total number of approvals on Fridays (day 6 of week) |
| ptnw7apv | profile total number of approvals on Saturdays (day 7 of week) |
| ptnwdaft | profile total number of weekday afternoon approvals in a month |
| ptnwdapv | profile total number of weekday approvals in a month |
| ptnwdeve | profile total number of weekday evening approvals in a month |
| ptnwdmor | profile total number of weekday morning approvals in a month |
| ptnwdnit | profile total number of weekday night approvals in a month |
| ptnweaft | profile total number of weekend afternoon approvals in a month |
| ptnweapv | profile total number of weekend approvals in a month |
| ptnweeve | profile total number of weekend evening approvals in a month |
| ptnwemor | profile total number of weekend morning approvals in a month |
| ptnwenit | profile total number of weekend night approvals in a month |
| pvdaybtwn | profile variance in number of days between trx's (min of 3 trx) |
| pvraudl | profile variance of dollars per auth across month |
| MERCHANT FRAUD VARIABLES | |
| mtotturn | Merchant Total turnover for this specific merchant |
| msicturn | Merchant Cumulative SIC code turnover |
| mctrtage | Merchant Contract age for specific merchant |
| maagsic | Merchant Average contract age for this SIC code |
| mavgnbtc | Merchant Average number of transactions in a batch |
| maamttrx | Merchant Average amount per transaction (average amount per authorization) |
| mvaramt | Merchant Variance of amount per transaction |
| mavgtbtc | Merchant Average time between batches |
| mavgtaut | Merchant Average time between authorizations for this merchant |
| mratks | Merchant Ratio of keyed versus swiped transactions |
| mnidclac | Merchant Number of identical customer accounts |
| mnidcham | Merchant Number of identical charge amounts |
| mtrxsrc | Merchant What is the source of transaction (ATM, merchant, etc.) |
| mtrxtrsp | Merchant How is the transaction transported to the source (terminal, non-terminal, voice authorization) |
| mfloor | Merchant Floor limit |
| mchgbks | Merchant Charge-backs received |
| mrtrvs | Merchant Retrievals received (per SIC, merchant, etc.). The issuer pays for retrieval. |
| macqrat | Merchant Acquirer risk management rate (in Europe one merchant can have multiple acquirers, but they don't have records about how many or who.) |
| mprevrsk | Merchant Previous risk management at this merchant? Yes or No |
| mtyprsk | Merchant Type of previous risk management (counterfeit, mutiple imprint, lost(stolen/not received) |
| msicrat | Merchant SIC risk management rate |
| mpctaut | Merchant Percent of transactions authorized |

Network Training: Once pre-processing is complete, the fraud-related variables are fed to the network and the network is trained. The preferred embodiment uses a modeling technique known as a "feed forward" neural network. This type of network estimates parameters which define relationships among variables using a training method. The preferred training method, well known to those skilled in the art, is called "backpropagation gradient descent optimization", although other well-known neural network training techniques may also be used.

One problem with neural networks built with conventional backpropagation methods is insufficient generalizability. Generalizability is a measure of the predictive value of a neural network. The attempt to maximize generalizability can be interpreted as choosing a network model with enough complexity so as not to underfit the data but not too much complexity so as to overfit the data. One measure of the complexity of a network is the number of hidden processing elements, so that the effort to maximize generalizability translates into a selection among models having different numbers of hidden processing elements. Unfortunately, it is often not possible to obtain all the nonlinear required for a problem by adding hidden processing elements without introducing excess complexity. Many weights that come with the addition of each new hidden processing element may not be required or even helpful for the modeling task at hand. These excess weights tend to make the network fit the idiosyncrasies or "noise" of the data and thus fail to generalize well to new cases. This problem, known as overfitting, typically arises because of an excess of weights.

Weight decay is a method of developing a neural network that minimizes overfitting without sacrificing the predictive power of the model. This method initially provides the network with all the nonlinearity it needs by providing a large number of hidden processing elements. Subsequently, it decays all the weights to varying degrees so that only the weights that are necessary for the approximation task remain. Two central premises are employed: 1) when given two models of equivalent performance on a training data set, favor the smaller model; and 2) implement a cost function that penalizes complexity as part of the backpropagation algorithm. The network is trained by minimizing this cost function. Complexity is only justified as it expresses information contained in the data. A weight set that embodies all or almost all of the information in the data and none of the noise will maximize generalizability and performance.

The cost function is constructed by introducing a "decay term" to the usual error function used to train the network. It is designed to optimize the model so that the network captures all the important information in the training set, but does not adapt to noise or random characteristics of the training set. In view of these requirements, the cost function must take into account not only prediction error, but also the significance of model weights. A combination of these two terms yields an objective function which, when minimized, generalizes optimally. Performing a conventional gradient descent with this objective function optimizes the model.

In introducing the decay term, an assumption is made about what constitutes information. The goal is to choose a decay term that accurately hypothesizes the prior distribution of the weights. In finding a good prior distribution, one examines the likelihood that the weights will have a given distribution without knowledge of the data.

Weigend et al, "Generalization by Weight-Elimination with Application to Forecasting", in *Advances in Neural Information Processing Systems* 3, pp. 875–82, and incorporated herein by reference, discloses the following cost function for weight decay:

$$\frac{1}{2}\sum_{k \in D}(target_k - output_k)^2 + \lambda \sum_{i \in W} \frac{\omega_i^2/\omega_o^2}{1+\omega_i^2/\omega_o^2} \qquad \text{(Eq. 1)}$$

Where:
  D is the data set;
  $target_k$ is the target, or desired, value for element k of the data set;
  $output_k$ is the network output for element k of the data set;
  l represents the relative importance of the complexity term;

W is the weight set;
  $w_i$ is the value of weight i; and
  $w_o$ is a constant that controls the shape of the curve that penalizes the weights.

The first term of the Weigend function measures the performance of the network, while the second term measures the complexity of the network in terms of its size. With this cost function, small weights decay rapidly, while large weights decay slowly or not at all.

A major failing of the Weigend cost function, and similar weight decay schemes, is that they do not accurately mimic the intended prior distribution. Finding a good prior distribution (or "prior") is a key element to developing an effective model. Most of the priors in the literature are sufficient to demonstrate the concept of weight decay but lack the strengths required to accommodate a wide range of problems. This occurs because the priors tend to decay weights evenly for a given processing element, without sufficiently distinguishing important weights (which contain more information) from unimportant weights (which contain less information). This often results either in 1) undesired decaying of important weights, which diminishes the power of the system to accommodate nonlinearity, or 2) undesired retention of excess unimportant weights, which leads to overfitting.

The present invention uses the following improved cost function, which addresses the above problems:

$$\frac{1}{2}\sum_{k \in D}(target_k - output_k)^2 + g\lambda \sum_{i \in W}\left(c_1 \omega_i^2 - \frac{1}{1+|\omega_i|}\right) \qquad \text{(Eq. 2)}$$

where g represents a new term known as the interlayer gain multiplier for the decay rate, and $c_1$ is a constant. The interlayer gain multiplier takes into account the relative proximity of the weights to the input and output ends of the network. Thus, the interlayer gain multiplier allows application of the decay term with greater potency to elements that are closer to the inputs, where the majority of the weights typically reside, while avoiding excessive decay on weights corresponding to elements closer to the outputs, which are more critical, since their elimination can effectively sever large numbers of input-side weights.

By intensifying decay on input-side elements, the cost function of Equation 2 improves the ability of model development component 801 to decay individual weights while preserving processing elements containing valuable information. The result is that weak interactions are eliminated while valid interactions are retained. By retaining as many processing elements as possible, the model does not lose the power to model nonlinearities, yet the overfitting problem is reduced because unnecessary individual weights are removed.

Once the cost function has been iteratively applied to the network, weights that have been decayed to a very small number (defined as e) are removed from the network. This step, known as "thresholding the net" is performed because it is often difficult to completely decay weights to zero.

Once the network has been trained using past data, the network's model definition is stored in data files. One portion of this definition, called the "CFG" file, specifies the parameters for the network's input variables, including such information as, for example, the lengths of the variables, their types, and their ranges. Referring now to FIG. 21, there is shown a portion of a typical CFG file, specifying parameters for an ACCOUNT variable 2101 (representing a customer account number) and a PAUDYMDY variable 2102 (a profile variable representing the ratio of transaction days divided by the number of days in the month).

The file formats used to store the other model definition files for the network are shown below.

ASCII File Formats

The ASCII network data files (.cta, .sta, .lca, .wta) consist of tokens (non-whitespace) separated by whitespace (space, tab, newline). Whitespace is ignored except to separate tokens. Use of line breaks and tabs is encouraged for clarity, but otherwise irrelevant.

File format notation is as follows:

Bracketed text denotes a token.

Nonbracketed text denotes a literal token which must be matched exactly, including case.

Comments on the right are not part of the file format; they simply provide further description of the format.

In the comments, vertical lines denote a block which can be repeated. Nested vertical lines denote repeatable sub-blocks.

.cta Format

| File format | Comments |
| --- | --- |
| cts | |
| <NetName> | |
| <Value> | \| Repeated as needed | cts and <NetName> must appear first. <NetName> is the standard abbreviation, lowercase (e.g., mbpn). The <Value>s are the network constants values, in the order defined within the constants structure. If a constants value is an array or structured type, each element or field must be a separate token, appearing in the proper order.

| Example | Comments |
| --- | --- |
| cts | |
| mbpn | |
| 2 | InputSize |
| 1 | OutputSize |
| 1 | cHidSlabs |
| 2 | HiddenSize[0] |
| 0 | HiddenSize[1] |
| 0 | HiddenSize[2] |
| 3 | RandomSeed |
| 1.0 | InitWeightMax |
| 0 | WtsUpdateFlag |
| 0 | ConnectInputs |
| 0 | FnClass |
| 1.0 | Parm1 |
| 1.0 | Parm2 |
| −1.0 | Parm3 |
| 0.0 | Parm4 |
| 0.0 | Parm5 |
| 1 | cEntTbl |
| 0.0 | xLow |
| 0.1 | xHigh |
| 0.2 | HiddenAlpha[0] |
| 0.0 | HiddenAlpha[1] |
| 0.0 | HiddenAlpha[2] |
| 0.1 | OutputAlpha |
| 0.9 | HiddenBeta[0] |
| 0.0 | HiddenBeta 1] |
| 0.0 | HiddenBeta[2] |
| 0.9 | OutputBeta |
| 0.0 | Tolerance |
| 0 | WtsUpdateFlag |
| 0 | BatchSize |

-continued

| Example | Comments |
| --- | --- |
| 0 | LinearOutput |
| 0 | ActThlFlag |
| 1 | StatsFlag |
| 1 | LearnFlag |

In this example, HiddenSize, HiddenAlpha, and HiddenBeta are all arrays, so each element (0, 1, 2) has a separate token, in the order they appear in the type.

.sta Format

| File format | Comments |
| --- | --- |
| sts | |
| <NetName> | |
| <cSlab> | |
| <nSlab> | \| Repeated cSlab times |
| <cPe> | \| |
| <state> | \| \|Repeated cPe times | sts and <NetName> must appear first. <NetName> is the standard abbreviation, lowercase. <cSlab> is a count of the slabs which have states stored in the file. The remainder of the file consists of cSlab blocks, each describing the states of one slab. The order of the slab blocks in the file is not important. <nSlab> is the slab number, as defined in the xxx.h file. cPe is the number of states for the slab. <state> is the value of a single state. If the state type is an array or structured type, each element or field must be a separate token, appearing in the proper order. There should be cPe <state> values in the slab block.

| Example | Comments |
| --- | --- |
| sts | |
| mbpn | |
| 6 | cSlab |
| 0 | nSlab - SlabInMbpn |
| 2 | cPeIn |
| 0.0 | StsIn[0] |
| 0.0 | StsIn[1] |
| 1 | nSlab - SlabTrnMbpn |
| 1 | cPeTrn |
| 0.0 | StsTrn[0] |
| 2 | nSlab - SlabHid0Mbpn |
| 2 | cpeHid0 |
| 0.0 | StsHidO[0] |
| 0.0 | StsHid0[1] |
| 5 | nSlab - SlabOutMbpn |
| 1 | cPeOut |
| 0.0 | StsOut[0] |
| 6 | nSlab - SlabBiasMbpn |
| 1 | cPeBias |
| 1.0 | StsBias[0] |
| 7 | nSlab - SlabStatMbpn |
| 3 | cPeStat |
| 0.0 | StsStat[0] |
| 0.0 | StsStat[1] |
| 0.0 | StsStat[2] | lca Format

| File format | Comments |
| --- | --- |
| lcl | |
| <NetName> | |
| <cSlab> | |
| <nSlab> | \|Repeated cSlab times |
| <cPe> | \| |
| <local> | \| \|Repeated cPe times |

The .lca format is just like the .sta format except that sts is replaced by lcl. Lcl and <NetName> must appear first. <NetName> is the standard abbreviation, lowercase. <cSlab> is a count of the slabs which have local data stored in the file. The remainder of the file consists of cSlab blocks, each describing the local data values of one slab. <nSlab> is the slab number, as defined in the xxx.h file. The order of the slab blocks in the file is not important. cPe is the number of local data values for the slab. <local> is the value of a single local data element. If the local data type is an array or structured type, each element or field must be a separate token, appearing in the proper order. There should be cPe <local> values in the slab block.

| Example | Comments |
| --- | --- |
| lcl | |
| mbpn | |
| 3 | cSlab |
| 2 | nSlab - SlabHid0Mbpn |
| 2 | cPe |
| 0.0 | LclHid0[0].Error |
| 0.0 | LclHid0[0].NetInp |
| 0.0 | LdHid0[1].Error |
| 0.0 | LdHid0[1].NetInp |
| 5 | nSlab - SlabOutMbpn |
| 1 | cPe |
| 0.0 | LclOut[0].Error |
| 0.0 | LclOut[0].NetInp |
| 7 | nSlab - SlabStatMbpn |
| 3 | cPe |
| 0 | LclStat[0].cIter |
| 0.0 | LclStat[0].Sum |
| 0 | LclStat[1].cIter |
| 0.0 | LclStat[1].Sum |
| 0 | LclStat[2].cIter |
| 0.0 | LclStat[2].Sum |

In this example, the <local> values are all structured types, so each field (Error and NetInp; cIter and Sum) has a separate token, in the order they appear in the type.

.wta Format

| File format | Comments |
| --- | --- |
| wts | |
| <NetName> | |
| <cClass> | |
| <nSlab> | \| Repeated cClass times |
| <nClass> | \| |
| <cIcn> | \| |
| <weight> | \| \| Repeated cIcn times | wts and <NetName> must appear first. <NetName> is the standard abbreviation, lowercase. <cClass> is a count of the slab/class combinations which have weights stored in the file. The remainder of the file consists of cClass blocks, each describing the weights of one slab. The order of the class blocks in the file is not important. <nSlab> is the slab number, as defined in the xxx.h file. <nClass> is the class number, as defined in the xxx.h file. <weight> is the value of a single weight. If the weight type is an array or structured type, each element or field must be a separate token, appearing in the proper order. There should be cIcn <weight> values in the slab block.

| Example | Comments |
| --- | --- |
| wts | |
| mbpn | |
| 2 | cClass |
| 2 | nSlab - SlabHid0Mbpn |
| 0 | nClass - PeHid0MbpnFromPrev |
| 6 | cIcn |
| 0.0 | WtsHid0[PE_0][0] |
| 0.0 | WtsHid0[PE_0][1] |
| 0.0 | WtsHid0[PE_0][2] |
| 0.0 | WtsHid0[PE_1][0] |
| 0.0 | WtsHid0[PE_1][1] |
| 0.0 | WtsHid0[PE_1][2] |
| 5 | nSlab - SlabOutMbpn |
| 0 | nClass - PeOutMbpnFromPrev |
| 3 | cIcn |
| 0.0 | WtsOut[PE_0][0] |
| 0.0 | WtsOut[PE_0][1] |
| 0.0 | WtsOut[PE_O][2] |

Weights values for a slab and class are stored as a one-dimensional array, but conceptually are indexed by two values—PE and interconnect within PE. The values are stored in row-major order, as exemplified here.

Transaction Processing Component 802

Once the model has been created, trained, and stored, fraud detection may begin. Transaction processing component 802 of system 100 preferably runs within the context of a conventional authorization or posting system for customer transactions. Transaction processing component 802 reads current transaction data and customer data from databases 805, 806, and generates as output fraud scores representing the likelihood of fraud for each transaction. Furthermore, transaction processing component 802 can compare the likelihood of fraud with a predetermined threshold value, and flag transactions for which the threshold is exceeded.

The current transaction data from database 805 typically includes information such as: transaction dollar amount; date; time (and time zone if necessary); approve/decline code; cash/merchandise code; available credit (or balance); credit line; merchant category code; merchant ZIP code; and PIN verification (if applicable).

The customer data from database 806 typically includes information from three sources: 1) general information on the customer; 2) data on all approved or declined transactions in the previous seven days; and 3) a profile record which contains data describing the customer's transactional pattern over the last six months. The general information on the customer typically includes information such as: customer ZIP code; account open date; and expiration date. The profile record is a single record in a profile database summarizing the customer's transactional pattern in terms of moving averages. The profile record is updated periodically (usually monthly) with all of the transactions from the period for the customer, as described below.

System 100 can operate as either a batch, semi-real-time, or real-time system. The structure and processing flow of each of these variations will now be described.

Figure 14:
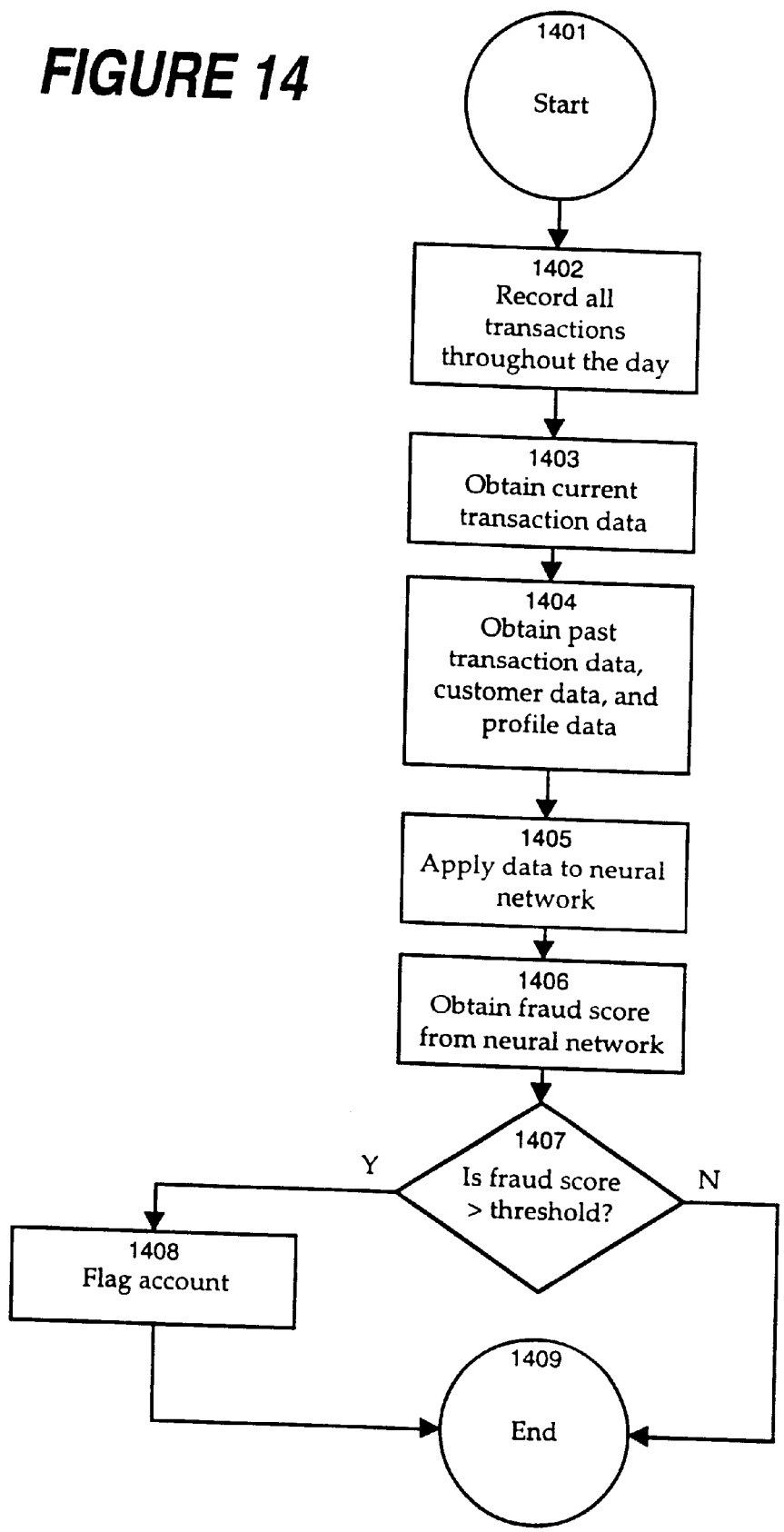
FIG. 14 is a flowchart showing operation of a batch transaction processing system according to the present invention.

Batch System: FIG. 14 shows operation of a batch system. Transactions are recorded throughout the day or other convenient period 1402. At the end of the day, the system performs steps 1403 to 1409 for each transaction. It obtains data describing the current transaction 1403, as well as past transaction data, customer data, and profile data 1404. It then applies this data to the neural network 1405 and obtains a fraud score 1406. If the fraud score exceeds a threshold 1407, the account is flagged 1408. In the batch system, therefore, the transaction which yielded the high fraud score cannot itself be blocked; rather, the account is flagged 1404 at the end of the day so that no future transactions are possible. Although the batch system does not permit immediate detection of fraudulent transactions, response-time constraints may mandate use of the batch system in some implementations.

Figure 15:
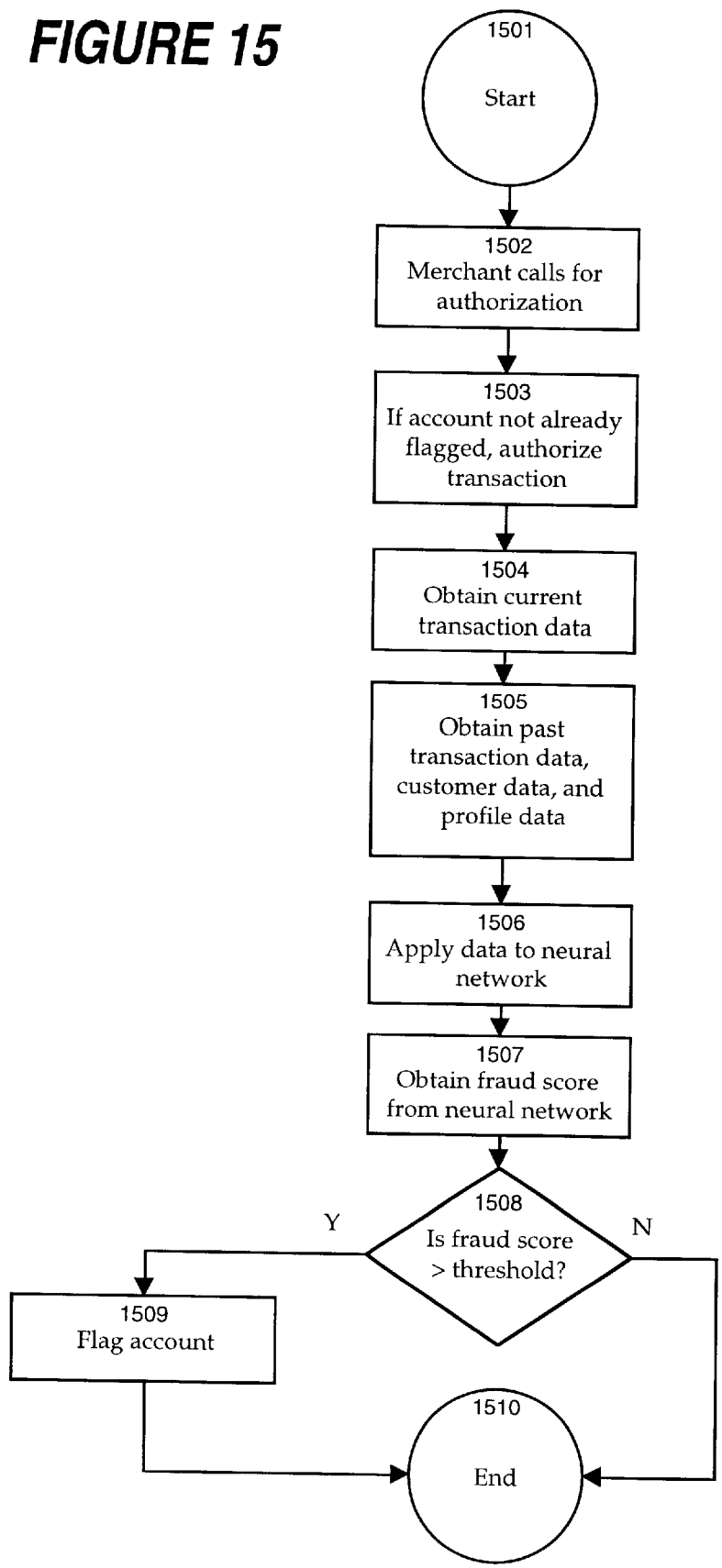
FIG. 15 is a flowchart showing operation of a semi-real-time transaction processing system according to the present invention.

Semi-Real-Time System: The semi-real-time system operates in a similar manner to the batch system and uses the same data files, but it ensures that no more than one high-scoring transaction is authorized before flagging the account. In this system, as shown in FIG. 15, fraud likelihood determination is performed (steps 1504 to 1509) immediately after the transaction is authorized 1503. Steps 1504 to 1509 correspond to steps 1403 to 1409 of the batch system illustrated in FIG. 14. If the likelihood of fraud is high, the account is flagged 1509 so that no future transactions are possible. Thus, as in the batch system, the current transaction cannot be blocked; however, the semi-real-time system allows subsequent transactions to be blocked.

Real-Time System: The real-time system performs fraud likelihood determination before a transaction is authorized. Because of response-time constraints, it is preferable to minimize the number of database access calls when using the real-time system. Thus, in this embodiment, all of the customer information, including general information and past transaction data, is found in a single record of profile database 806. Profile database 806 is generated from past transaction and customer data before the transaction processing component starts operating, and is updated after each transaction, as described below. Because all needed data are located in one place, the system is able to retrieve the data more quickly than in the batch or semi-real-time schemes. In order to keep the profile database 806 current, profile records are updated, using moving averages where applicable, after each transaction.

Figure 16:
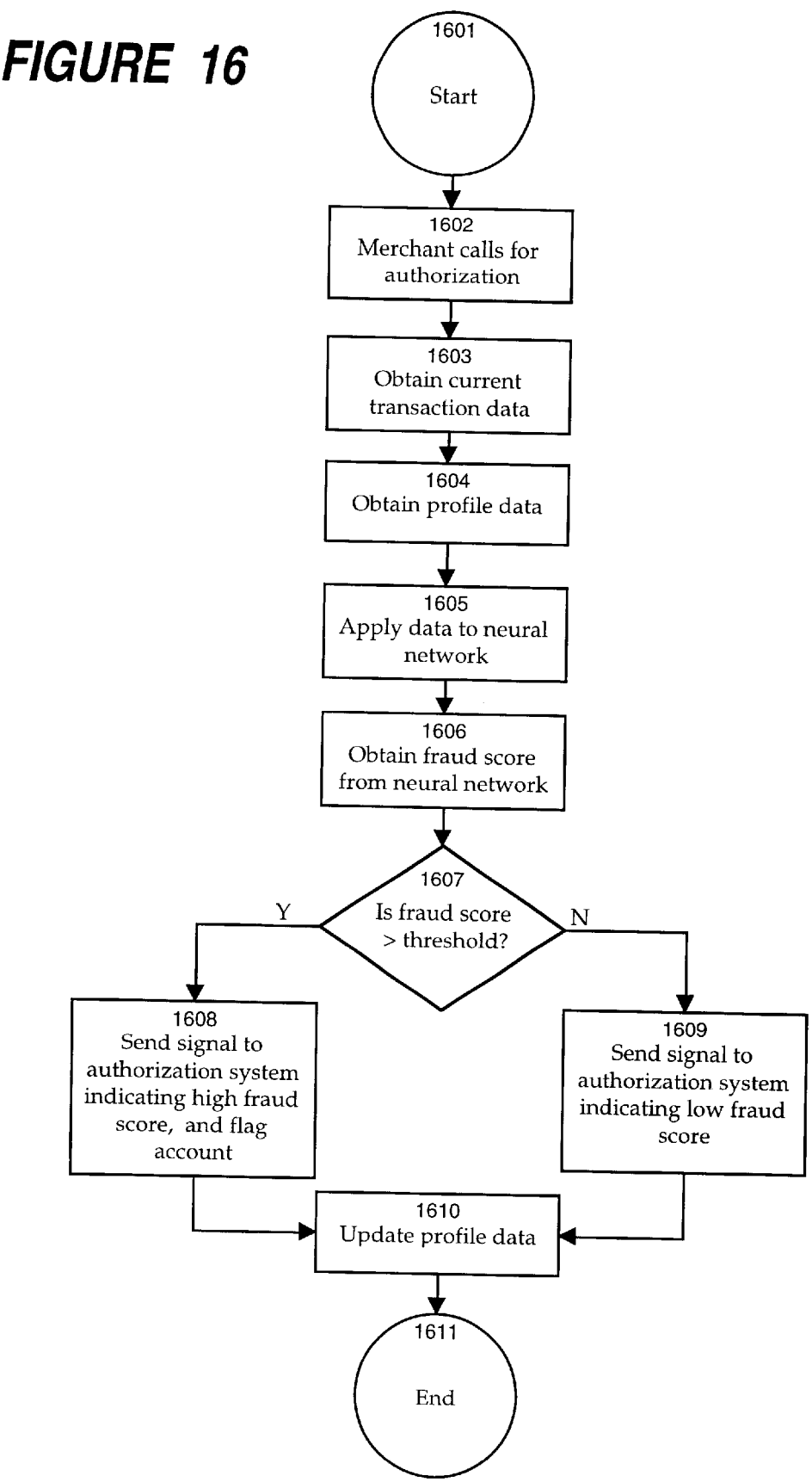
FIG. 16 is a flowchart showing operation of a real-time processing system according to the present invention.

Referring now to FIG. 16, there is shown a flowchart of a real-time system using the profile database. Upon receiving a merchant's request for authorization on a transaction 1602, the system obtains data for the current transaction 1603, as well as profile data summarizing transactional patterns for the customer 1604. It then applies this data to the stored neural network model 1605. A fraud score (representing the likelihood of fraud for the transaction) is obtained 1606 and compared to a threshold value 1607. Steps 1601 through 1607 occur before a transaction is authorized, so that the fraud score can be sent to an authorization system 1608 and the transaction blocked by the authorization system if the threshold has been exceeded. If the threshold is not exceeded, the low fraud score is sent to the authorization system 1609. The system then updates customer profile database 806 with the new transaction data 1610. Thus, in this system, profile database 806 is always up to date (unlike the batch and semi-real-time systems, in which profile database 806 is updated only periodically).

Figure 12:
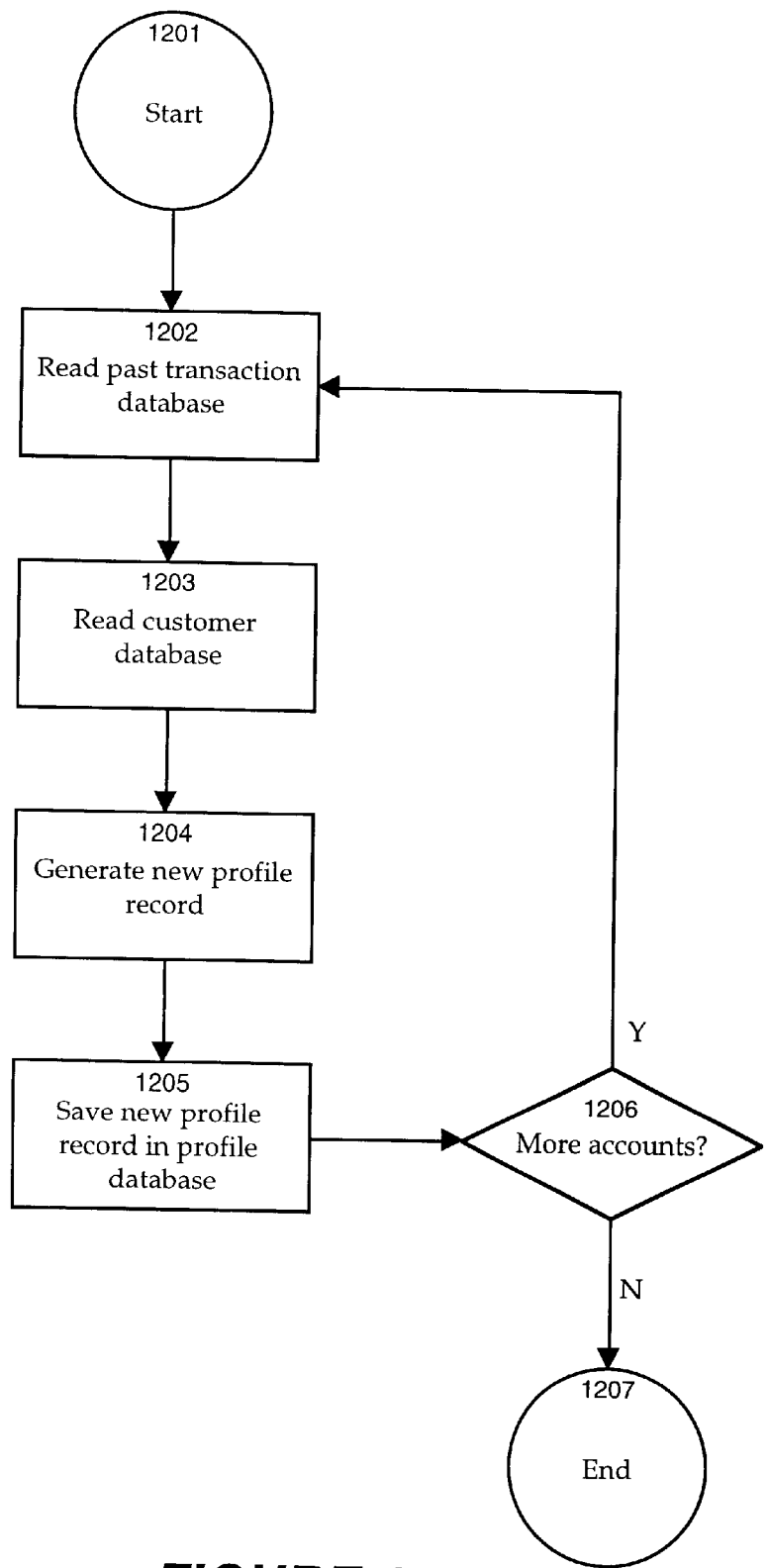
FIG. 12 is a flowchart of the method of creating a profile record of the present invention.

Referring now to FIG. 12, there is shown the method of creating a profile record. The system performs the steps of this method when there is no existing profile record for the customer. The system reads the past transaction database 1101 for the past six months and the customer database 1103 (steps 1202 and 1203 respectively). It generates a new profile record 1204 with the obtained data and saves it in the profile database 1205. If there are more accounts to be processed 1206, it repeats steps 1202 through 1205.

Figure 13:
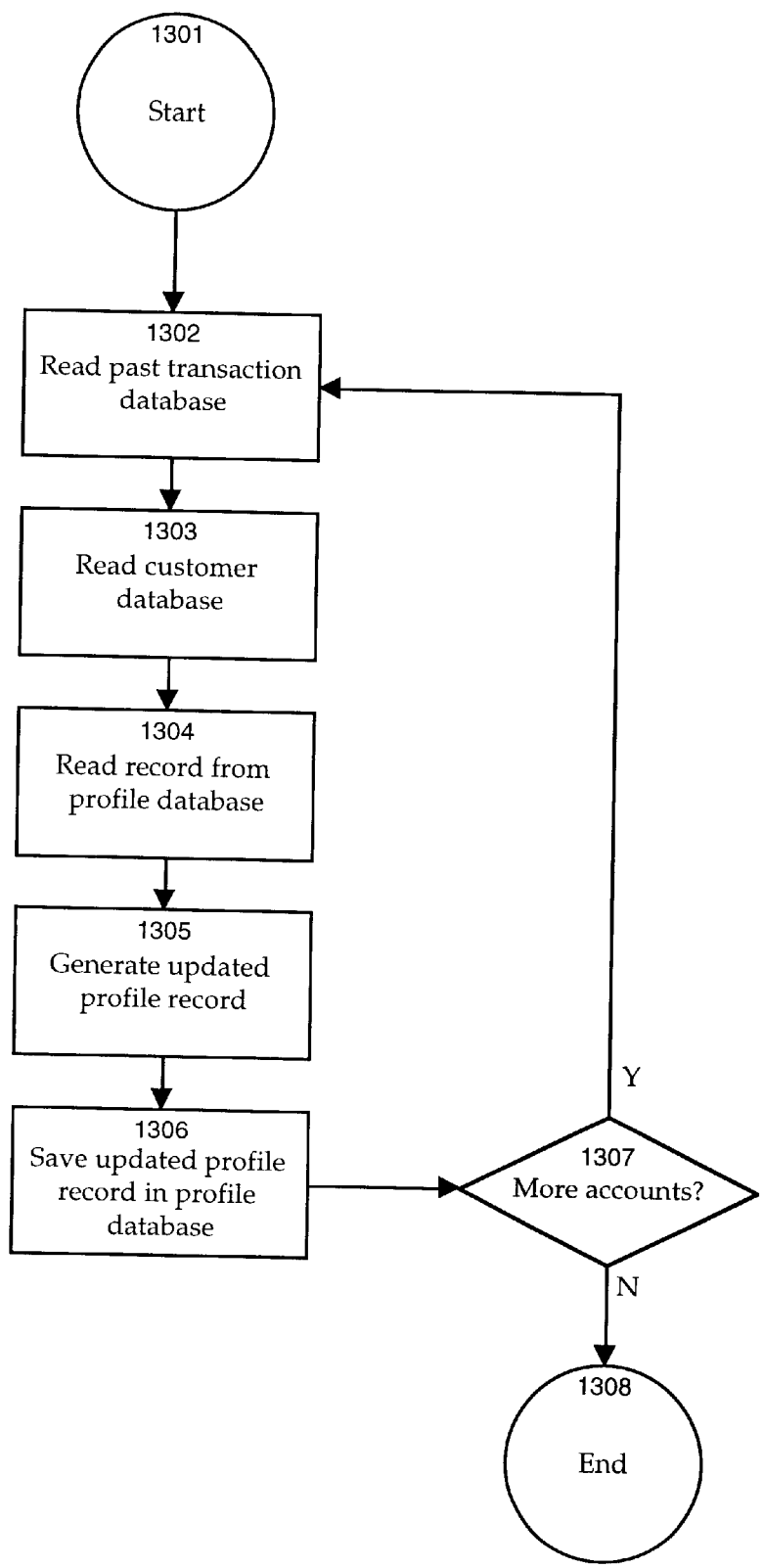
FIG. 13 is a flowchart of the method of updating a profile record of the present invention.

Referring now to FIG. 13, there is shown the method of updating an existing profile record. The system reads the past transaction database 1101 for the past six months, customer database 1103 and profile database (steps 1302, 1303, and 1304 respectively). It combines the data into a single value for each variable in the profile database. This value is generated using one of two formulas.

For variables that represent average values over a period of time (for example, mean dollars of transactions in a month), Equation 3 is used:

$$\text{newProfData} = ((1\alpha)*\text{oldProfData}) + (\alpha*\text{currentVal})) \quad \text{(Eq. 3)}$$

For variables that represent extreme values over a period of time (for example, highest monthly balance), Equation 4 is used:

$$\text{newProfData} = \max(\text{currentVal}, \beta*\text{oldProfData}) \quad \text{(Eq. 4)}$$

In Equations 3 and 4:

newProfData is the new value for the profile variable;

oldProfData is the old value for the profile variable;

currentVal is the most recent value of the variable, from the past transaction database; and $\alpha$ and $\beta$ are decay factors which are used to give more importance to recent months and less importance to months further in the past.

The value of $\beta$ is set so that older data will "decay" at an acceptable rate. A typical value for $\beta$ is 0.95.

The value of $\alpha$ is generated as follows: For the batch and semi-real-time systems, $\alpha$ is set to a value such that the contribution of the value from more than six months previous is nearly zero. For profiles that have been in existence for at least six months, the value of $\alpha$ is $\frac{1}{6}$. For newer profiles, the value is $1/(n+1)$, where n is the number of months since the profile was created. For the real-time system, profile updates do not occur at regular intervals. Therefore, $\alpha$ is determined using the following equation:

$$\alpha = 1 - \exp(-t/T) \quad \text{(Eq. 5)}$$

where:

t is the time between the current transaction and the last transaction; and

T is a time constant for the specific variable.

Furthermore, for the real-time system, currentVal represents the value of the variable estimated solely using information related to the current transaction and the time since the last transaction, without reference to any other historical information.

Once the new values for the profile variables have been generated, they are placed in an updated profile record 1305 and saved in the profile database 1306. If there are more accounts to be processed 1307, the system repeats steps 1302 through 1306.

In all of these embodiments, the current transaction data and the customer data are preferably pre-processed to derive fraud-related variables which have been empirically determined to be effective predictors of fraud. This is done using the same technique and the same fraud-related variables as described above in connection with neural network training.

Figure 17:
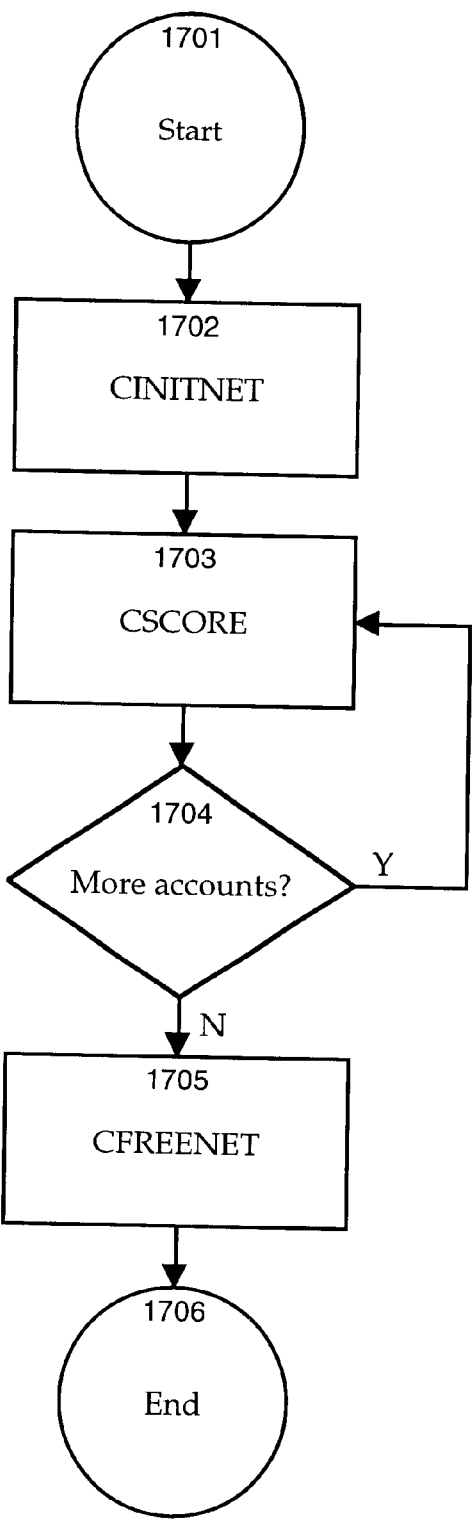
FIG. 17 is a flowchart showing the overall operation of the transaction processing component of the present invention.
Figure 18:
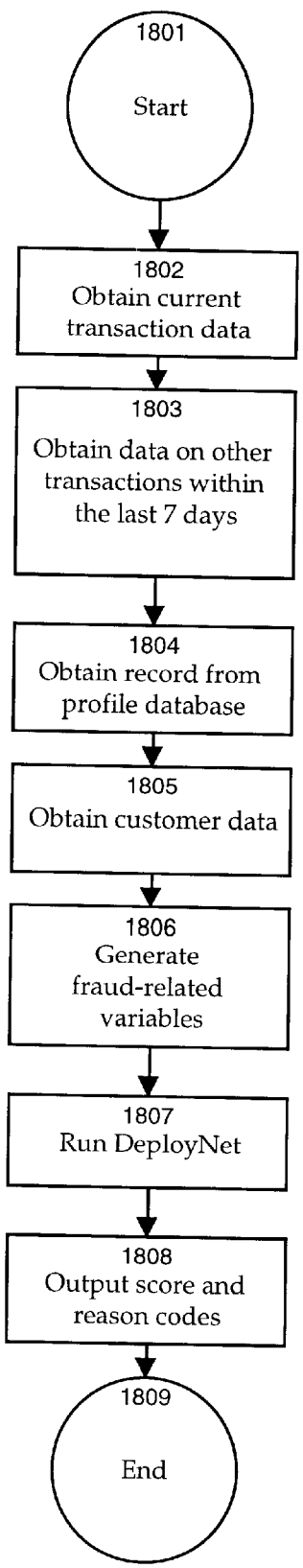
FIG. 18 is a flowchart showing the operation of module CSCORE of the present invention.
Figure 19:
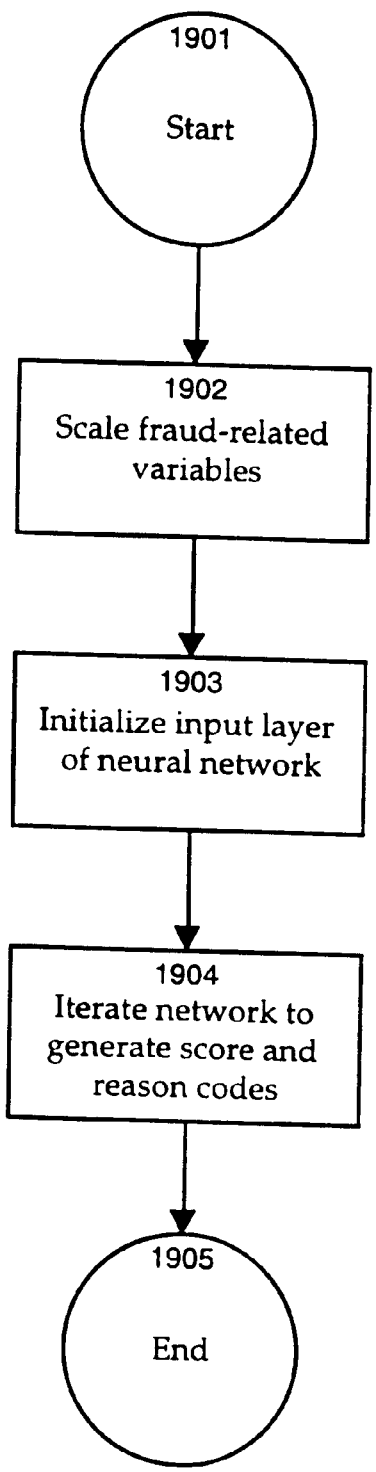
FIG. 19 is a flowchart showing the operation of Deploy-Net of the present invention.

Referring now to FIGS. 17 through 19, there are shown flowcharts illustrating the operation of the preferred embodiment of the transaction processing component. Some of the individual elements of the flowchart are indicated by designations which correspond to module names. The following brief description summarizes the transaction processing component.

Referring now to FIG. 17, there is shown the overall operation of transaction processing component 802. First the system runs module CNITNET 1702, which initializes network structures. Then, it runs module CSCORE 1703. Module CSCORE 1703 uses current transaction data, data describing transactions over the past seven days, a profile record, and customer data to generate a fraud score indicating the likelihood that the current transaction is fraudulent, as well as reason codes (described below). The system then checks to see whether there are more transactions to be processed 1704, and repeats module CSCORE 1703 for any additional transactions. When there are no more to be processed, the system runs module FREENET 1705, which frees the network structures to allow them to be used for further processing.

Referring now to FIG. 18, there is shown the operation of module CSCORE 1703. First, module CSCORE 1703 obtains current transaction data, data describing transactions of the past seven days, the profile record, and customer data (steps 1802 through 1805). From these data, module CSCORE 1703 generates the fraud-related variables 1806 described above. Then, it runs module DeployNet 1807, which applies the fraud-related variables to the stored neural network and provides a fraud score and reason codes. CSCORE then outputs the score and reason codes 1808.

Referring now to FIG. 19, there is shown the operation of module DeployNet 1807. Module DeployNet 1807 first scales the fraud-related variables 1902 to match the scaling previously performed in model development. If the value of a variable is missing, DeployNet sets the value to equal the mean value found in the training set. Then it applies the scaled variables to the input layer of neural network 108, in step 1903. In step 1904, it processes the applied data through the network to generate the fraud score. The method of iterating the network is well known in the art.

In addition to providing fraud scores, in step 1904, module DeployNet 1807 optionally generates "reason codes". These codes indicate which inputs to the model are most important in determining the fraud score for a given transaction. Any technique that can track such reasons may be used. In the preferred embodiment, the technique set forth in U.S. Pat. No. 5,398,300 for "Neural Network Having Expert System Functionality", filed Dec. 30, 1991, the disclosure of which is hereby incorporated by reference, is used.

The following module descriptions summarize the functions performed by the individual transaction processing modules.

FALCON C FILES
FILE NAME: CINITNET
DESCRIPTION: Contains code to allocate and initialize the network structures.
   FUNCTION NAME: CINITNET( )
   DESCRIPTION: Allocate and initialize the network structures.
FILE NAME: CSCORE
DESCRIPTION: Generates fraud related variables and iterates the neural network.
   FUNCTION NAME: SCORE( )
   DESCRIPTION: Creates fraud related variables from raw variables and makes calls to initialize the input layer and iterate and neural network.
   FUNCTION NAME: setInput( ) DESCRIPTION: Sets the input value for a processing element in the input layer.
   FUNCTION NAME: hiReason( )
   DESCRIPTION: Finds the three highest reasons for the score.
FILE NAME: CFREENET
DESCRIPTION: Makes function calls to free the network structures.
   FUNCTION NAME: CFREENET( )
   DESCRIPTION: Frees the network structures.
FILE NAME: CCREATEP
DESCRIPTION: Contains the cardholder profile creation code.
   FUNCTION NAME: createpf( )
   DESCRIPTION: Creates a profile record for a cardholder using the previous month's authorizations and cardholder data.
FILE NAME: CUPDATEP
DESCRIPTION: Updates a profile of individual cardholder activity.
   FUNCTION NAME: updatepf( )
   DESCRIPTION: Updates a profile record for a cardholder using the previous profile record values as well as the previous month's authorizations and cardholder data.
FILE NAME: CCOMMON
DESCRIPTION: This file contains functions which are needed by at least two of the following: createpf( ), updatepf( ), score( ).
   FUNCTION NAME: accumMiscCnts( )
   DESCRIPTION: Increments counters of various types for each authorization found.
   FUNCTION NAME: accumSicCnts( )
   DESCRIPTION: Increments SIC variable counters.
   FUNCTION NAME: initSicCounts( )
   DESCRIPTION: Initializes the SIC variable counters.
   FUNCTION NAME: updatesSicMovAvgs( )
   DESCRIPTION: Updates the SIC profile variables.
   FUNCTION NAME: writeMiscToProfile( )
   DESCRIPTION: Writes various variables to the profile record after they have been calculated.
   FUNCTION NAME: hncDate( )
   DESCRIPTION: Converts a Julian date to a date indicating the number of days since Jan. 1, 1990.
   FUNCTION NAME: missStr( )
   DESCRIPTION: Checks for "missing" flag (a period) in a null terminated string. String must have only blanks and a period to qualify as missing. A string with only blanks will also qualify as "missing".

Cascaded Operation

One way to improve system performance is via "cascaded" operation. In cascaded operation, more than one neural network model is used. The second neural network model is trained by model development component 801 in a similar manner to that described earlier. However, in training the second model, model development component 801 uses only those transactions that have fraud scores, as determined by prior application to the first neural network model, above a predetermined cascade threshold. Thus, the second model provides more accurate scores for high-scoring transactions. While the same fraud-related variables are available to train both models, it is often the case that different variables are found to be significant in the two models.

Figure 20:
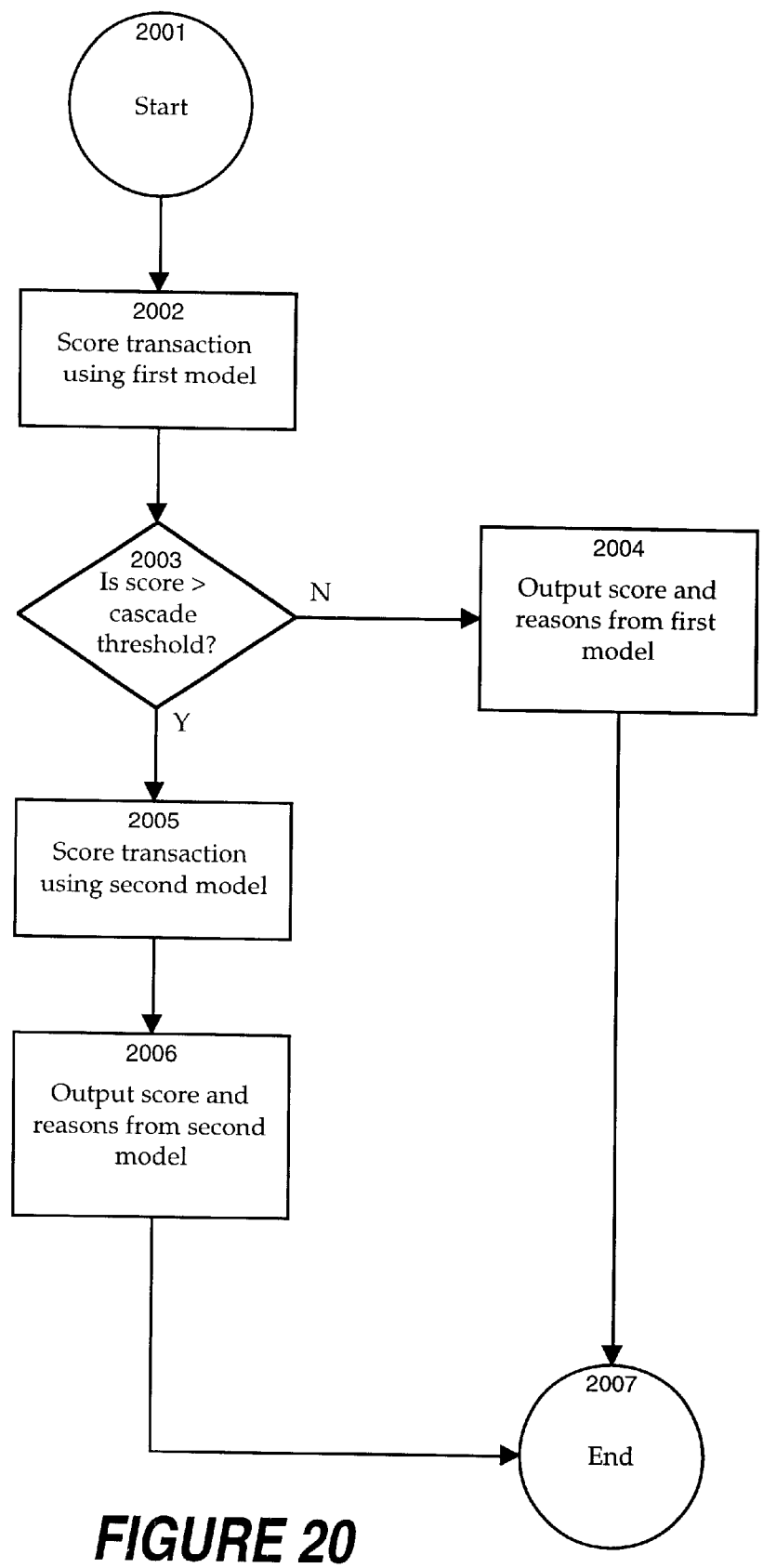
FIG. 20 is a flowchart showing cascaded operation of the present invention.

Referring now to FIG. 20, there is shown a flowchart of the operation of the transaction processing component in a cascaded system. First, transaction processing component 802 scores each transaction using the first model 2002, as described above. Those transactions that score above the cascade threshold 2003 are applied to the second neural network model 2005. The system outputs scores and reason codes from either the first model 2004 or the second model 2006, as appropriate.

The above-described cascading technique may be extended to include three or more neural network models, each having a corresponding cascade threshold.

Performance Monitor

The system periodically monitors its performance by measuring a performance metric comprising the fraud detection rate and the false positive rate. Other factors and statistics may also be incorporated into the performance metric. When the performance metric falls below a predetermined performance level, the system may either inform the user that the fraud model needs to be redeveloped, or it may proceed with model redevelopment automatically.

From the above description, it will be apparent that the invention disclosed herein provides a novel and advantageous method of detecting fraudulent use of customer accounts and account numbers, which achieves high detection rates while keeping false positive rates relatively low. The foregoing discussion discloses and describes merely exemplary methods and embodiments of the present invention. As will be understood by those familiar with the art, the invention may be embodied in many other specific forms without departing from the spirit or essential characteristics thereof. For example, other predictive modeling techniques besides neural networks might be used. In addition, other variables might be used in both the model development and transaction processing components.

Accordingly, the disclosure of the present invention is intended to be illustrative of the preferred embodiments and is not meant to limit the scope of the invention. The scope of the invention is to be limited only by the following claims.

We claim:

1. A computer implemented method of determining a level of risk for a transaction in an account of a transacting entity, the method comprising:

storing a predictive model of risk-associated transactions generated from high risk and low risk historical transactions of transacting entities and the profiles of the transacting entities;

receiving in real time a current transaction of a transacting entity for a type of account, the current transaction received prior to completion of the transaction by the transacting entity;

generating in real time a signal indicative of the level of risk associated with the current transaction by applying the current transaction and a profile summarizing a pattern of historical transactions of the transacting entity to the predictive model by:

selecting high risk and low risk transactions and transacting entity data associated with the selected transactions;

segregating transactions into time intervals, with each time interval representing at least one transaction of the account during the time interval;

randomly selecting low risk time intervals, and for any sequence of high risk time intervals of an individual account, selecting only initial high risk time intervals; and generating risk related variables from the selected time intervals and the profiles associated with the selected accounts; and transmitting in real time the signal indicative of the level of risk to at least one of the transacting entity or a second entity to allow for either completion or termination of the transaction.

2. The method of claim 1, where the time interval is a day.

3. The method of claim 1, further comprising:

generating in real time an authorization response signal for the current transaction as a function of the signal indicative of risk.

4. The method of claim 3, wherein generating the authorization response signal comprises:

determining in real time whether to approve or decline the current transaction according to the signal indicative of risk associated with the current transaction.

5. The method of claim 3, further comprising:

receiving the current transaction from a point of sale device associated with the current transaction; and transmitting the authorization signal to the point of sale device.

6. A computer implemented method of determining a level of risk for a transaction in an account of a transacting entity, the method comprising:

for each of a first plurality of transacting entities, generating a profile of transaction patterns of the transacting entity using historical transactions of the transacting entity;

generating and storing a predictive model of fraudulent transactions from a plurality of fraudulent transactions and the profiles of the transacting entities of the fraudulent transactions, and a plurality of non-fraudulent transactions and the profiles of the transacting entities of the non-fraudulent transactions;

receiving in real time a current transaction of a transacting entity for a type of account, the current transaction received prior to completion of the transaction by the transacting entity;

generating in real time a signal indicative of the level of fraud associated with the current transaction by applying the current transaction and a profile summarizing a pattern of historical transactions of the transacting entity to the predictive model; and transmitting in real time the signal indicative of the level of fraud to at least one of the transacting entity or a second entity to allow for either completion or termination of the transaction.

7. A computer implemented method of determining a level of risk for a transaction in an account of a transacting entity, the method comprising:

receiving in real time, data pertaining to a pending first transaction of a transacting entity for a type of account, the data received prior to completion of the first transaction by the transacting entity;

generating in real time a signal indicative of the level of risk associated with the first transaction by comparing the data pertaining to the first transaction of the transacting entity with a profile summarizing a pattern of historical transactions of the transacting entity;

determining in real time an authorization response for the first transaction as a function of the signal indicative of risk associated with the transaction;

transmitting in real time the authorization response to either the transacting entity or a second entity to allow either the transacting entity or the second entity to terminate or complete the first transaction; and determining whether to approve or decline a second transaction as a function of the signal indicative of the level of risk associated with the first transaction.

8. The method of claim 7, wherein the signal indicative of the risk associated with the transaction is a continuous fraud score representing the likelihood that the current transaction is fraudulent.

9. The method of claim 8, further comprising:
determining an authorization response for a second transaction of the transacting entity subsequent to the first transactions as a function of fraud score associated with the first transaction.

10. The method of claim 8, further comprising:
responsive to the fraud score of the current transaction exceeding a threshold amount, not authorizing the current transaction, and designating the account associated with the transacting entity of the current transaction as a high risk account so as to prevent subsequent transactions of the transacting entity from being authorized.

11. The method of claim 8, further comprising:
updating the profile of the transacting entity associated with the current transaction using current transaction data.

12. The method of claim 8, further comprising:
determining the fraud score for the current transaction as a function of a number of transactions by the transacting entity per time interval.

13. The method of claim 8, further comprising:
determining the fraud score for the current transaction as a function of a number of transactions by the transacting entity in a recent time interval relative to an historical average number of transactions by the transacting entity.

14. The method of claim 8, further comprising:
determining the fraud score for the current transaction as a function of a dollar value of transactions by the transacting entity per time interval.

15. The method of claim 8, further comprising:
determining the fraud score for the current transaction as a function of a dollar value of transactions by the transacting entity in a recent time interval relative to an historical average dollar value of transactions by the transacting entity.

16. The method of claim 8, further comprising:
determining the fraud score for the current transaction as a function of a number of authorizations by the transacting entity per time interval.

17. The method of claim 8, further comprising
determining the fraud score for the current transaction as a function of a number of authorizations for the transacting entity in a recent time interval relative to an historical average number of authorizations for the transacting entity.

18. The method of claim 8, further comprising:
determining the fraud score for the current transaction as a function of the Standard Industrial Classification (SIC) codes of recent merchants visited by the transacting entity.

19. The method of claim 8, further comprising:
determining the fraud score for the current transaction as a function of the SIC codes of recent merchants visited by the transacting entity relative to the SIC codes of merchants historically visited by the transacting entity.

20. The method of claim 8, further comprising:
determining the fraud score for the current transaction as a function of the amount spent by the transacting entity in each of a number of SIC code merchant groups during a recent time interval.

21. The method of claim 8, further comprising:
determining the fraud score for the current transaction as a function of the percentage of the amount spent in a recent time interval by the transacting entity in each of a number of SIC code merchant groups.

22. The method of claim 8, further comprising:
determining the fraud score for the current transaction as a function of a number of transactions in a recent time interval by the transacting entity in each of a number of SIC code merchant groups.

23. The method of claim 8, further comprising:
determining the fraud score for the current transaction as a function of the percentage of the number of transactions in a recent time interval by the transacting entity in each of a number of SIC code merchant groups.

24. The method of claim 8, further comprising:
determining the fraud score for the current transaction as a function of a level of risk associated with the SIC code of merchants for recent transactions of the transacting entity.

25. The method of claim 8, further comprising:
determining the fraud score for the current transaction as a function of a level of risk associated with one or more geographic regions for recent transactions of the transacting entity.

26. The method of claim 8, further comprising:
determining the fraud score for the current transaction as a function of an average amount of time between transactions of the transacting entity.

27. The method of claim 8, further comprising:
determining the fraud score for the current transaction as a function of an average amount of time between transactions of the transacting entity in a recent time interval relative to an historical average amount of time between transactions of the transacting entity.

28. The method of claim 8, further comprising:
determining the fraud score for the current transaction as a function of a number of multiple transaction declines for transactions of the transacting entity at a same merchant.

29. The method of claim 8, further comprising:
determining the fraud score for the current transaction as a function of a number of out-of-state transactions of the transacting entity.

30. The method of claim 8, further comprising:
determining the fraud score for the current transaction as a function of an average number of transaction declines for the transacting entity.

31. The method of claim 8, further comprising:
determining the fraud score for the current transaction as a function of a volume of transactions for a merchant processing the current transaction.

32. The method of claim 8, further comprising:
determining the fraud score for the current transaction as a function of a cumulative volume of transactions for merchants having a same SIC code as the merchant processing the current transaction.

33. The method of claim 8, further comprising:
determining the fraud score for the current transaction as a function of a length of time that a merchant processing the current transaction has been associated with an acquirer.

34. The method of claim 8, further comprising:
determining the fraud score for the current transaction as a function of an average number of transactions per batch for a merchant processing the current transaction.

35. The method of claim 8, further comprising:
determining the fraud score for the current transaction as a function of an average amount per transaction for an authorization for a merchant processing the current transaction.

36. The method of claim 8, further comprising:
determining the fraud score for the current transaction as a function of a rate of transactions for the merchant processing the current transaction.

37. The method of claim 8, further comprising:
determining the fraud score for the current transaction as a function of a number of keyed-in transactions relative to swiped transactions for a merchant processing the current transaction.

38. The method of claim 8, further comprising:
determining the fraud score for the current transaction as a function of a percent of authorized transactions for a merchant processing the current transaction, relative to all of the transactions of the merchant for which authorization is requested.

39. The method of claim 8, further comprising:
determining the fraud score for the current transaction as a function of a cumulative volume of transactions for merchants having a same SIC code as the merchant processing the current transaction.

40. The method of claim 8, further comprising:
the high risk transactions and low risk transactions are fraudulent transactions and non-fraudulent transactions respectively.

41. The method of claim 8, wherein the current transaction is a first transaction, further comprising:
authorizing the first transaction regardless of the fraud score for the current transaction;
receiving a second transaction of the same transacting entity as the first transaction; and
determining in whether to approve or decline the second transaction as a function of the fraud score for the first transaction.

42. A computer implemented method of determining a fraud score for a transaction in an account of a transacting entity, the method comprising:
generating a predictive model of risk-associated transactions from high risk and low risk historical transactions of transacting entities and profiles of the transacting entity, for substantially the same type of account as the transaction by:
selecting high risk and low risk transactions and transacting entity data associated with the selected transactions;
segregating the selected transactions into account-days, with each account-day representing at least one transaction of the accound during a day;
randomly selecting low risk account-days, and for any sequence of high risk account-days of an individual account, selecting only initial high risk account-day; and
generating risk related variables from the randomly selected low risk account days and the selected initial high risk account days and the profiles associated with the selected accounts;
for each of a plurality of transactions in a batch of transactions, generating a fraud score for the transaction by applying the transaction and a profile of the transacting entity of the transaction to the predictive model;
authorizing each of the transactions in the batch regardless of the fraud score associated with the transaction; and
for each transaction in the batch, responsive to the fraud score of the transaction exceeding a threshold amount, designating the account associated with the transacting entity of the transaction as a high risk account.

43. A computer implemented method of determining a fraud score for a transaction in an account of a transacting entity, the method comprising:
storing a predictive model of risk-associated transactions generated from high risk and low risk historical transactions that are for substantially the same type of account as current transactions of transacting entities and profiles of the transacting entity, each profile summarizing a pattern of historical transactions of a transacting entity, for substantially the same type of account as the transaction;
receiving in real time a current transaction of a transacting entity, the current transaction received prior to completion of the transaction by the transacting entity;
authorizing the current transaction prior to generating a fraud score associated with the current transaction;
generating a continuous fraud score indicative of a probability that the current transaction is fraudulent by applying the current transaction of the transacting entity and the profile of the transacting entity to the predictive model; and
responsive to the fraud score of the current transaction exceeding a threshold amount, designating the account associated with the transacting entity of the current transaction as a high risk account so as to prevent subsequent transactions of the transacting entity from being authorized.

44. A computer implemented method for developing a predictive model for determining a risk score indicative of a level of risk in a transaction associated with a transacting entity, comprising the operations of:
receiving for a plurality of transacting entities, historical transaction data for transactions occurring over a period of time;
for each of the transacting entities, creating a profile summarizing patterns of the transactions of the transacting entity; and
creating the predictive model using the transaction data of each transaction for a type of account, the profile of the transacting entity making each transaction wherein the profile is for substantially the same type of account as each transaction, and data categorizing each transaction with respect to a level of risk in the transaction, wherein creating the predictive model includes;
selecting high risk transactions and accounts associated therewith, and a random sample of low risk transactions and accounts associated therewith;
segregating the selected transactions into account-days, each account-dayl associated with one of the selected accounts and at least one transaction of the account occurring during a given day;
selecting account-days by randomly selecting account-days that do not include a high risk transaction, and for any sequence of account-days in an account each of which include at least one high risk transaction, selecting only an earliest account-day; and
generating risk-related variables from the selected account-days and the profiles associated with the selected accounts.

45. The method of claim 44, wherein the high risk transactions and low risk transactions are fraudulent transactions and non-fraudulent transactions respectively, and the risk-related variables are fraud related variables.

46. The method of claim 44, further comprising:
applying the risk-related variables of the selected time intervals, and the profiles associated with the selected account-days to a neural network to create the predictive model.

47. The method of claim 44, wherein each transaction is categorized as either a fraudulent or a non-fraudulent transaction.

48. The method of claim 44, further comprising:
creating a profile for a transacting entity having a plurality of fraud related variables, including a variable describing a historical average number of transactions by the transacting entity over a time interval.

49. The method of claim 44, further comprising
creating a profile for a transacting entity having a plurality of fraud related variables, including a variable describing a historical average dollar value of transactions by the transacting entity over a time interval.

50. The method of claim 44, further comprising
creating a profile for a transacting entity having a plurality of fraud related variables, including a variable describing a historical average number of authorizations for the transacting entity over a time interval.

51. The method of any of claims 1, 6, 7, 42, 43, or 44, further comprising:
generating in real time the profile of the account holder in response to the current transaction.

52. The method of any of claims 1, 6, 7, 42, 43, or 44, wherein the profile summarizes debit card type transactions of the transacting entity.

53. The method of claim 52, wherein the current transaction is a debit card type transaction, and the signal indicative of risk is a continuous fraud score indicating the likelihood that the current transaction is fraudulent.

54. The method of any of claims 1, 6, 7, 42, 43, or 44, wherein the profile summarizes telephone calling card type transactions of the transacting entity.

55. The method of claim 54, wherein the current transaction is a telephone calling card type transaction, and the signal indicative of risk is a continuous fraud score indicating the likelihood that the current transaction is fraudulent.

56. A computer program product for controlling a computer system to process transactions in accounts of account holders, comprising:
program code communicatively coupled to a database of account information for account holders and account transactions for the account holders that generates a profile of an account holder by summarizing patterns of historical transactions of the account holder for a type of account;
program code that communicatively couples with a communications network and receives in real time a current transaction of an account holder from a point of sale device coupled to the communications network and performing the current transaction, wherein the current transaction is for substantially the same type of account as the historical transactions;
program code that receives in real time data from the current transaction and generates a signal indicative of a level of risk associated with the current transaction by comparing the current transaction of the account holder with the profile of the account holder;
program code that couples with the generating program code to receive the signal indicative of the level of risk and that generates in real time an authorization response signal for the current transaction as a function of the level of risk;
program code that transmits in real time the authorization signal to the point of sale device;
program code that updates the profile of the account holder using the current transaction; and
a computer readable medium that stores the program codes.

57. A computer program product for controlling a computer system to process transactions in accounts of account holders, comprising:
program code communicatively coupled to a database of account information for account holders and account transactions for the account holders that generates a profile of an account holder by summarizing patterns of historical transactions of the account holder for a type of account;
program code that communicatively couples with a communications network and receives in real time a current transaction of an account holder from a point of sale device coupled to the communications network and performing the current transaction, wherein the current transaction is for substantially the same type of account as the historical transactions;
program code that receives in real time data from the current transaction and generates a signal indicative of a level of risk associated with the current transaction by comparing the current transaction of the account holder with the profile of the account holder;
program code that couples with the generating program code to receive the signal indicative of the level of risk and that generates in real time an authorization response signal for the current transaction as a function of the level of risk;
program code that transmits in real time the authorization signal to the point of sale device;
program code that stores a predictive model of risk associated transactions developed from the historical transactions of the account holders and the profiles of the account holders;
program code that compares the current transaction of the account holder to the profile of the account holder by applying the current transaction and the profile of the account holder to the predictive model; and
a computer readable medium that stores the projram codes.

58. A computer program product for controlling a computer system to determine a level of risk in an account of a transacting entity, the program product comprising:
a computer readable medium that stores program code;
a database including, for each of a plurality of transacting entities, a profile of historical transaction patterns of the transacting entity for a type of account;
program code for executing a predictive model of risk associated transactions, the predictive model generated from high risk and low risk transactions and profiles of transacting entities;
program code for receiving in real time a current transaction of a transacting entity, wherein the current transaction is for substantially the same type of account as the historical transactions;
program code for generating in real time a signal indicative of the level of risk associated with the current transaction by applying the current transaction and the profile of the transacting entity to the predictive model;
program code for determining in real time whether to approve or decline the current transaction according to the signal indicative of risk associated with the current transaction; and program code, responsive to the level of risk of the current transaction exceeding a threshold amount, for not authorizing the current transaction;

program code, responsive to the level of risk of the current transaction exceeding the threshold amount, for designating the account associated with the transacting entity of the current transaction as a high risk account so as to prevent subsequent transactions of the transacting entity from being authorized.

59. The product program of claim 58, further comprising:

program code for generating a predictive model, comprising program code for:

selecting high risk and low risk transactions and transacting entity data associated with the selected transactions;

segregating transactions into time intervals, with each time interval representing at least one transaction of the account during the time interval;

selecting time intervals by randomly selecting low risk time intervals, and for any sequence of high risk time intervals of an individual account, selecting only initial high risk time intervals; and generating risk related variables from the selected time intervals and the profiles associated with the selected accounts.

60. The program product of claim 58, further comprising:

program code for generating a profile of transaction patterns of a transacting entity using historical transactions of the transacting entity, and for storing the profiles in the database; and program code for generating the predictive model of fraudulent transactions from a plurality of fraudulent transactions and the profiles of the transacting entities of the fraudulent transactions, and a plurality of non-fraudulent transactions and the profiles of the transacting entities of the non-fraudulent transactions.

61. The program product of claim 58, further comprising:

program code for determining whether to approve or decline a subsequent transaction of the same transacting entity as a function the signal indicative of risk associated with the current transaction.

62. The program product of claim 58, further comprising:

program code for repeating the operations of receiving a current transaction and generating a signal indicative of the level of risk associated with the current transaction for each of a batch of transactions in a period of time;

program code for authorizing each of the transactions in the batch regardless of the level of risk associated with the transaction; and program code for processing each transaction in the batch and responsive to the level of risk of the transaction exceeding a threshold amount, designating the account associated with the transacting entity of the transaction as a high risk account.

63. The program product of claim 58, further comprising:

program code for repeating the operations of receiving a current transaction and generating a signal indicative of the level of risk associated with the current transaction for a batch of transactions in a period of time, wherein for each transaction in the batch the program code:

responsive to the account associated with the transacting entity of the transaction having been designated a high risk account, does not authorize the transaction;

responsive to the account associated with the transacting entity of the transaction having not been designated a high risk account, authorizes the transaction; and responsive to the level of risk of the transaction exceeding a threshold amount, designates the account associated with the transacting entity of the transaction as a high risk account.

64. The program product of claim 58, wherein:

the signal indicative of the level of risk associated with the current transaction is a signal indicative of a probability that the current transaction is fraudulent; and the high risk transactions and low risk transactions are fraudulent transactions and non-fraudulent transactions respectively.

65. The program product of claim 58, further comprising:

program code for updating the profile of the transacting entity associated with the current transaction using current transaction data.

66. A computer program product for controlling a computer system to process accounts associated with transactions, the program product comprising:

a computer readable medium that stores program code;

program code that receives a plurality of current transactions for a plurality of transacting entities, each current transaction associated with an account of a transacting entity;

program code that generates a continuous fraud score for each current transaction indicating a likelihood that the current transaction is fraudulent;

program code that ranks the accounts by the fraud scores of their respective current transactions, from a most significant fraud score to a least significant fraud score; and program code that provides user selectable fraud control actions for application to selected ones of the accounts.

67. A computer program product for controlling a computer system to develop a predictive model for determining a risk score indicative of a level of risk in a transaction associated with a transacting entity, comprising:

a computer readable medium that stores program code;

program code that receives for each of a plurality of transacting entities, historical transaction data for transactions of the transacting entity occurring over a period of time;

program code that creates, for each of the transacting entities, a profile summarizing patterns of the transactions of the transacting entity; and program code that creates the predictive model using the transaction data of each transaction for a type of account, the profile of the transacting entity making each transaction wherein the profile is for substantially the same type of account as each transaction, and data categorizing each transaction with respect to a level of risk in the transaction, wherein program code that creates the predictive model further comprises program code that:

selects high risk transactions and accounts associated therewith, and a random sample of low risk transactions and accounts associated therewith;

segregates the selected transactions into time intervals, each time interval associated with one of the selected accounts and at least one transaction of the account during the time interval;

randomly selects time intervals that do not include a high risk transaction, and for any sequence of time intervals each including at least one high risk transaction, selects only and at least one of an earliest time interval; and generates risk-related variables from the selected time intervals and the profiles associated with the selected accounts.

68. The program product of claim 67, wherein the time interval is a day.

69. The program product of claim 67, further comprising:

program code that applies the fraud-related variables derived from selected time intervals, and the profiles associated with the selected time intervals to a neural network to create the predictive model.

70. The program product of claim 67, further comprising:

program code that creates a profile for a transacting entity having a plurality of fraud related variables, including a variable describing a historical average rate of transactions by the transacting entity over a time interval.

71. The program product of claim 67, further comprising:

program code that creates a profile for a transacting entity having a plurality of fraud related variables, including a variable describing a historical average dollar value of transactions by the transacting entity over a time interval.

72. The program product of claim 62, further comprising:

program code that creates a profile for a transacting entity having a plurality of fraud related variables, including a variable describing a historical average rate of authorizations for the transacting entity over a time interval.

73. A user interface of a computer program product that executes on a computer system for detecting fraudulent transactions, the user interface comprising:

an account number display field for displaying an account number of an account holder;

an account holder name display field for displaying the name of the account holder;

a fraud score display field for displaying a fraud score indicating the likelihood that a current transaction for the account holder is fraudulent;

a display field for displaying at least one transaction of the account holder having a current transaction with a fraud score indicating that it is likely that the current transaction is fraudulent; and at least one reason display field for displaying a reason the current transaction is likely to be fraudulent.

74. The user interface of claim 73, further comprising:

a display field for displaying a plurality of account numbers, each account number having a fraud score indicating a likelihood that a current transaction for the account number is fraudulent, the account numbers ordered by their fraud scores.

75. The user interface of claim 73, further comprising:

a user interface including a plurality of predetermined possible fraud control actions to be taken with respect to a current account number; and program code that applies a user selected one of the fraud control actions to the current account number.

76. The user interface of claim 73, further comprising:

a display field for displaying a fraud score cutoff value defining a threshold fraud score for which transactions having fraud scores exceeding the fraud score cutoff value are selected as being fraudulent transactions; and a display field for displaying a number of accounts with current transactions having fraud scores greater than or equal to the fraud score cutoff value.

77. A computer assisted method of processing a credit card transaction, the method comprising:

receiving in real time a current credit card transaction of a credit card account holder;

deriving variables related to the current credit card transaction of the credit card account holder and past credit card transactions of the credit card account holder by:
accessing a profile of the credit card account holder, the profile summarizing past credit card transactions of the credit card account holder; and
deriving some of the variables from the profile; and generating in real time from the derived variables a continuous fraud score indicating a likelihood that the current credit card transaction is fraudulent.

78. The computer assisted method of claim 77, wherein generating the fraud score comprises applying the derived variables to a predictive model of fraudulent credit card transactions.

79. The computer assisted method of claim 77, wherein generating the fraud score comprises selecting the fraud score as a function of a degree to which the current credit card transaction deviates from the profile of the credit card account holder and is consistent with a model of fraudulent transactions, the fraud score indicating a likelihood that the current credit card transaction is fraudulent.

* * * * *

UNITED STATES PATENT AND TRADEMARK OFFICE
CERTIFICATE OF CORRECTION

PATENT NO. : 6,330,546 B1
DATED : December 11, 2001
INVENTOR(S) : Gopinathan et al.

It is certified that error appears in the above-identified patent and that said Letters Patent is hereby corrected as shown below:

Title page,
Item [56], References Cited, replace "U.S. Patent No. 5,344,495" with
-- U.S. Patent No. 5,345,595 --.

Column 33,
Line 48, replace "accound" with -- account --.

Column 34,
Line 10, replace "entity" with -- entities --.
Line 52, replace "account-daylassociated" with -- account-dayassociated --.

Column 36,
Line 44, replace "projram" with -- program --.

Column 39,
Line 27, replace "claim 62" with -- claim 67 --.

Signed and Sealed this

Twenty-ninth Day of April, 2003

JAMES E. ROGAN
*Director of the United States Patent and Trademark Office*